(12) United States Patent  (10) Patent No.: US 7,849,951 B2
Borchers et al.  (45) Date of Patent: Dec. 14, 2010

(54) MATERIALS HANDLING VEHICLE HAVING AT LEAST ONE CONTROLLER COUPLED TO A FRONT WALL OF A FRAME

(75) Inventors: Charles F. Borchers, Yorkshire, OH (US); Andrew D. Smith, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 224 days.

(21) Appl. No.: 11/928,286

(22) Filed: Oct. 30, 2007

(65) Prior Publication Data

US 2008/0202858 A1  Aug. 28, 2008

Related U.S. Application Data

(60) Provisional application No. 60/891,996, filed on Feb. 28, 2007.

(51) Int. Cl.
*B62D 33/06* (2006.01)

(52) U.S. Cl. ........... 180/305; 180/89.12; 187/222

(58) Field of Classification Search ........... 180/305, 180/89.12, 90, 89.19, 313; 187/222, 224, 187/225, 226, 233, 237, 238
See application file for complete search history.

(56) References Cited

U.S. PATENT DOCUMENTS

| | | | |
|---|---|---|---|
| 3,901,339 A | | 8/1975 | Williamson |
| 3,998,288 A | | 12/1976 | Aoki |
| 4,026,378 A | * | 5/1977 | DePriester ............ 180/68.5 |
| 4,284,987 A | | 8/1981 | Gibson et al. |
| 4,322,107 A | | 3/1982 | Ishizuka et al. |
| 4,986,387 A | | 1/1991 | Thompson et al. |
| 5,297,645 A | * | 3/1994 | Eckersley et al. ...... 180/68.5 |
| 5,890,562 A | * | 4/1999 | Bartels et al. .......... 187/224 |
| 6,087,800 A | * | 7/2000 | Becker et al. ........... 318/778 |
| 6,182,778 B1 | | 2/2001 | Henshaw et al. |
| 6,182,797 B1 | | 2/2001 | Tebbe et al. |
| 6,189,636 B1 | * | 2/2001 | Kikukawa ............... 180/68.5 |
| 6,345,677 B1 | * | 2/2002 | Eckersley et al. ...... 180/68.5 |
| 6,437,701 B1 | | 8/2002 | Muller |
| 6,557,586 B1 | * | 5/2003 | Lockyer et al. ........ 137/637 |
| 6,856,503 B2 | * | 2/2005 | Apfelbacher et al. ... 361/676 |
| 6,871,721 B2 | * | 3/2005 | Smiley et al. ........... 180/333 |

(Continued)

FOREIGN PATENT DOCUMENTS

GB  2387363 A  * 10/2003

OTHER PUBLICATIONS

Coker, Robert A.; Office Action-Non-final Rejection in U.S. Appl. No. 11/928,227; Nove. 9, 2009; U.S. Patent and Trademark Office; Alexandria, VA.

(Continued)

*Primary Examiner*—J. Allen Shriver, II
*Assistant Examiner*—John D Walters
(74) *Attorney, Agent, or Firm*—Stevens & Showalter LLP

(57) ABSTRACT

A materials handling vehicle is provided comprising a frame including structure for defining an operator compartment and structure for defining a battery compartment; first and second front wheels coupled to the frame; a rear steer wheel assembly coupled to the frame; an electric motor; and a controller coupled to a front wall of the frame to control the operation of the electric motor.

24 Claims, 21 Drawing Sheets

U.S. PATENT DOCUMENTS

| | | |
|---|---|---|
| 7,284,627 B2 | 10/2007 | Leifert |
| 7,332,881 B2 * | 2/2008 | Clark et al. .................. 318/139 |
| 7,374,004 B2 * | 5/2008 | Kraimer et al. ............ 180/68.5 |
| 2005/0162829 A1 * | 7/2005 | Aker et al. .................. 361/695 |
| 2006/0076427 A1 * | 4/2006 | Schneider et al. ....... 237/12.3 A |
| 2006/0151249 A1 | 7/2006 | Kluver et al. |
| 2008/0202857 A1 | 8/2008 | Waltz et al. |

OTHER PUBLICATIONS

Coker, Robert A.; Office Action-Non-final Rejection in U.S. Appl. No. 11/928,227; Apr. 23, 2010; U.S. Patent and Trademark Office; Alexandria, VA.

* cited by examiner

MATERIALS HANDLING VEHICLE HAVING AT LEAST ONE CONTROLLER COUPLED TO A FRONT WALL OF A FRAME

This application claims the benefit of U.S. Provisional Application No. 60/891,996, filed Feb. 28, 2007 and entitled "MATERIALS HANDLING VEHICLE HAVING AT LEAST ONE CONTROLLER COUPLED TO A FRONT WALL OF A FRAME," the disclosure of which is incorporated herein by reference.

BACKGROUND OF THE INVENTION

Stand-up counterbalanced fork lift trucks are known in the prior art. In one known three-wheel counterbalanced fork lift truck, one or more controllers are located over a battery compartment and a contactor panel is located near an operator compartment. Because the contactor panel is near the operator compartment, the size of the operator compartment is limited.

An improved counterbalanced fork lift truck design is desired wherein the size of an operator compartment is optimized.

SUMMARY OF THE INVENTION

In accordance with a first aspect of the present invention, a materials handling vehicle is provided comprising a frame including structure for defining an operator compartment and structure for defining a battery compartment; first and second front wheels coupled to the frame; a rear steer wheel assembly coupled to the frame; at least one electric motor; and at least one controller coupled to a front wall of the frame to control the operation of the at least one electric motor.

The at least one electric motor may comprise a first drive motor coupled to the first wheel for driving the first wheel. The at least one controller may comprise a first controller coupled to the front wall of the frame to control the operation of the first drive motor.

The at least one electric motor may further comprise a second drive motor coupled to the second front wheel. The at least one controller may further comprise a second controller. The second controller may control the operation of the second drive motor.

The vehicle may further comprise a motor/pump assembly coupled to the frame; a hydraulic reservoir coupled to the frame and in fluid communication with the motor/pump assembly; mast apparatus coupled to the frame and including a pair of forks; and a third controller coupled to the front wall of the frame to control the operation of the motor/pump assembly.

At least one of the controllers may comprise cooling fins. The vehicle may further comprise a fan mounted to the frame near the frame front wall to force air along a path in front of the frame front wall so as to pass over the cooling fins.

The front wall of the frame is preferably defined by a front wall of the battery compartment. The frame may further comprise a side wall extending forward of the battery compartment front wall. The fan is preferably mounted adjacent to the side wall.

The side wall may include at least one opening. The fan pulls air through the at least one opening in the side wall and moves the air along the path in front of the battery compartment front wall.

In accordance with a second aspect of the present invention, a materials handling vehicle is provided comprising a frame including structure for defining an operator compartment and structure for defining a battery compartment; first and second front wheels coupled to the frame; a rear steer wheel assembly coupled to the frame; at least one electric motor coupled to the frame; a motor/pump assembly coupled to the frame; a hydraulic fluid reservoir coupled to the frame; mast apparatus coupled to the frame and including a pair of forks; at least one controller; and a fan. The at least one controller is preferably coupled to a front wall of the frame to control the operation of at least one of the electric motor and the motor/pump assembly. The at least one controller preferably includes cooling fins. The fan is preferably mounted to the frame near the frame front wall to force air along a path in front of the frame front wall so as to pass over the cooling fins.

The front wall of the frame may be defined by a front wall of the battery compartment. The frame may further comprise a side wall extending forward of the battery compartment front wall. The fan may be mounted adjacent to the frame side wall.

The frame side wall preferably includes at least one opening. The fan pulls air through the at least one opening in the frame side wall and directs the air along the path in front of the battery compartment front wall.

The at least one controller may comprises a rear wall. The cooling fins preferably extend from the rear wall and may be located adjacent to the frame front wall.

In accordance with a third aspect of the present invention, a materials handling vehicle is provided comprising a frame including structure for defining an operator compartment and structure for defining a battery compartment; first and second front wheels coupled to the frame; at least one drive motor coupled to the frame and at least one of the first and second wheels for driving the one wheel; a rear steer wheel assembly coupled to the frame; a motor/pump assembly coupled to the frame; a hydraulic fluid reservoir coupled to the frame; mast apparatus coupled to the frame and including a pair of forks; and at least one controller coupled to a front wall of the frame to control the operation of at least one of the drive motor and the motor/pump assembly.

The at least one controller may comprise a controller for controlling the at least one drive motor, a controller for controlling the motor/pump assembly, or first and second controllers for controlling respectively the at least one drive motor and the motor/pump assembly.

DETAILED DESCRIPTION OF THE INVENTION

Figure 1:
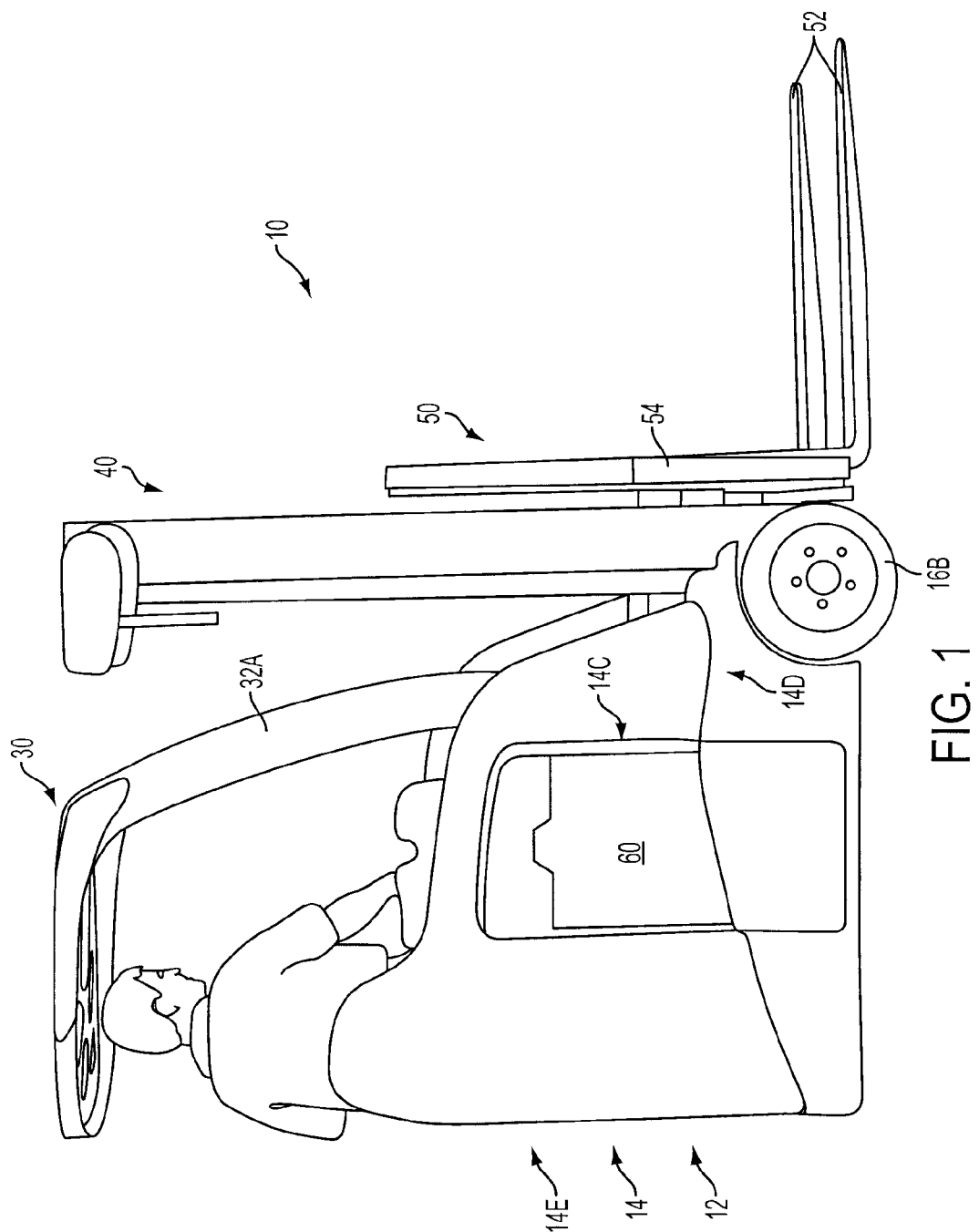
FIG. 1 is a side view of a stand-up counterbalanced truck constructed in accordance with a first embodiment of the present invention.

In the following detailed description of the preferred embodiments, reference is made to the accompanying drawings that form a part hereof, and in which are shown by way of illustration, and not by way of limitation, specific preferred embodiments in which the invention may be practiced. It is to be understood that other embodiments may be utilized and that changes may be made without departing from the spirit and scope of the present invention.

The present invention is described herein with reference to a stand-up counterbalanced truck 10. It will be apparent to those skilled in the art that the invention and variations of the invention can be more generally applied to a variety of other materials handling vehicles, such as a sit-down counterbalanced truck (not shown).

Reference is now made to FIGS. 1-4, which illustrate the stand-up counterbalanced fork lift truck 10 constructed in accordance with a first embodiment of the present invention. The fork lift truck 10 comprises a frame 12 including a main body 14. The main body 14 includes a battery compartment 14C for housing a battery 60 (the battery is not illustrated in FIGS. 5-8 and 11), a front portion 14D and a rear portion 14E, see FIGS. 1 and 2. The truck 10 further comprises first and second driven wheels 16A and 16B coupled to the front portion 14D of the frame main body 14, and a rear steer wheel assembly 18 coupled to the rear portion 14E of the frame main body 14. The first and second driven wheels 16A and 16B and the rear steer wheel assembly 18 allow the truck 10 to move across a floor surface. A front wall 12D of the frame 12 defines a front wall 140C of the battery compartment 14C, see FIGS. 5 and 11.

An operator compartment 20 is located within the frame main body 14 for receiving an operator. When in the operator compartment 20, the operator stands on a floorboard 21, see FIGS. 2 and 4. The speed and direction of movement (forward or reverse) of the truck 10 can be controlled by the operator via a multifunction controller 22, see FIGS. 3 and 5-7. Steering is effected via a steering tiller 24, see FIGS. 3-8.

The frame 12 further includes an overhead guard 30 coupled to the main body 14 by first and second A-pillars 32A and 32B and a rear support post 34.

Figure 2:
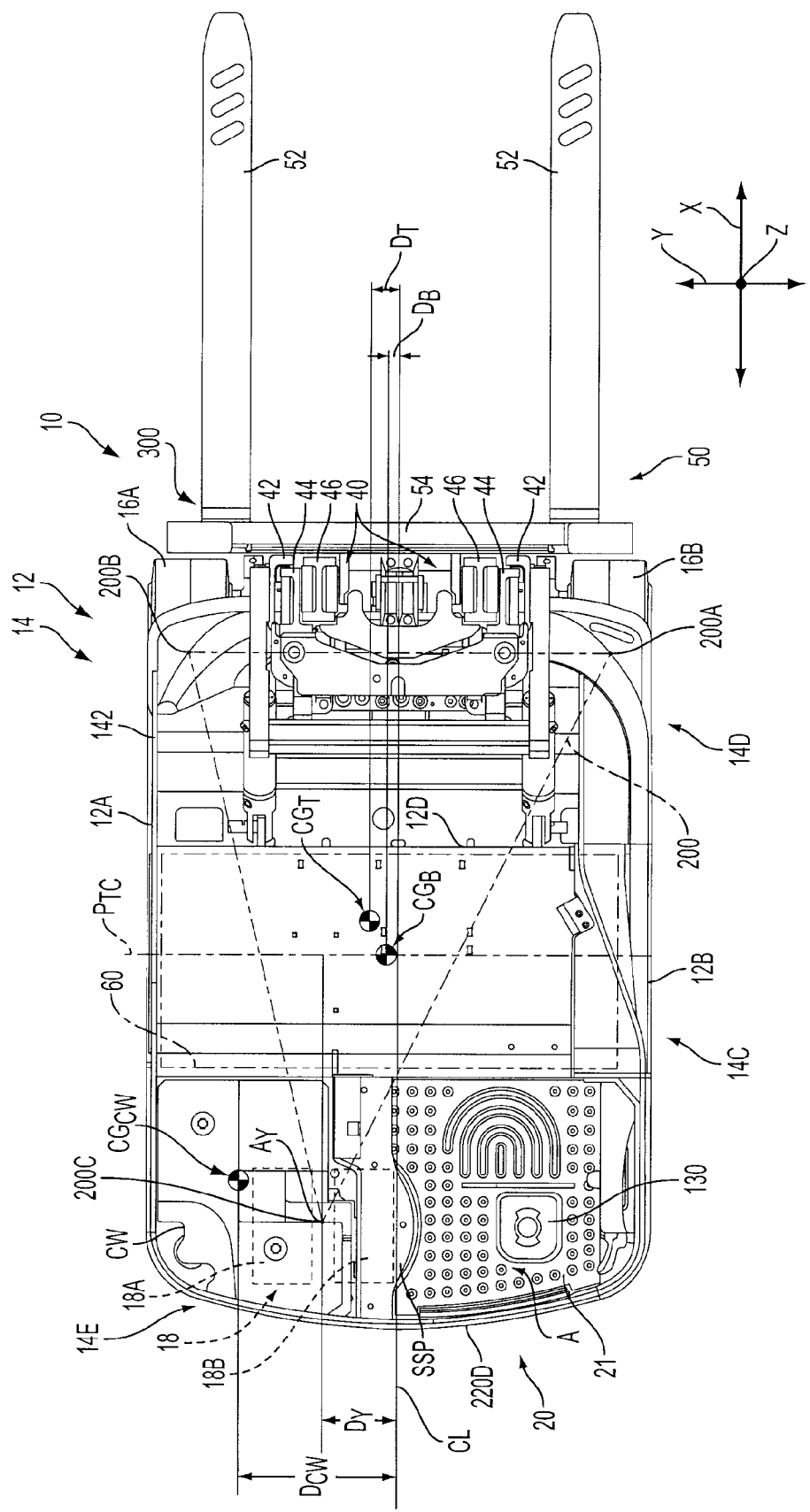
FIG. 2 is plan view of the truck illustrated in FIG. 1, with an overhead guard, a tiller, a multifunction controller and panel covers removed.
Figure 3:
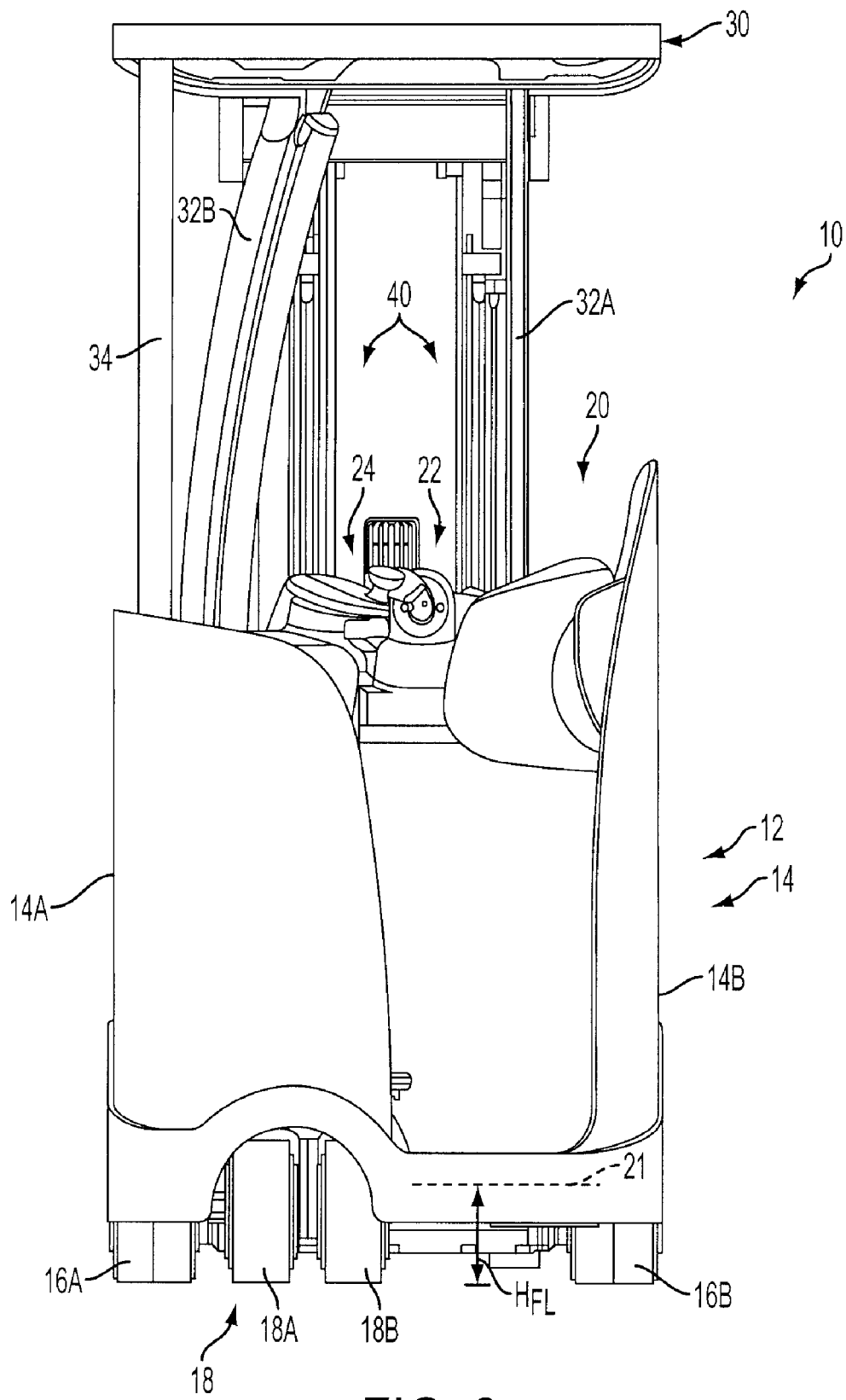
FIG. 3 is a rear view of the truck illustrated in FIG. 1.
Figure 4:
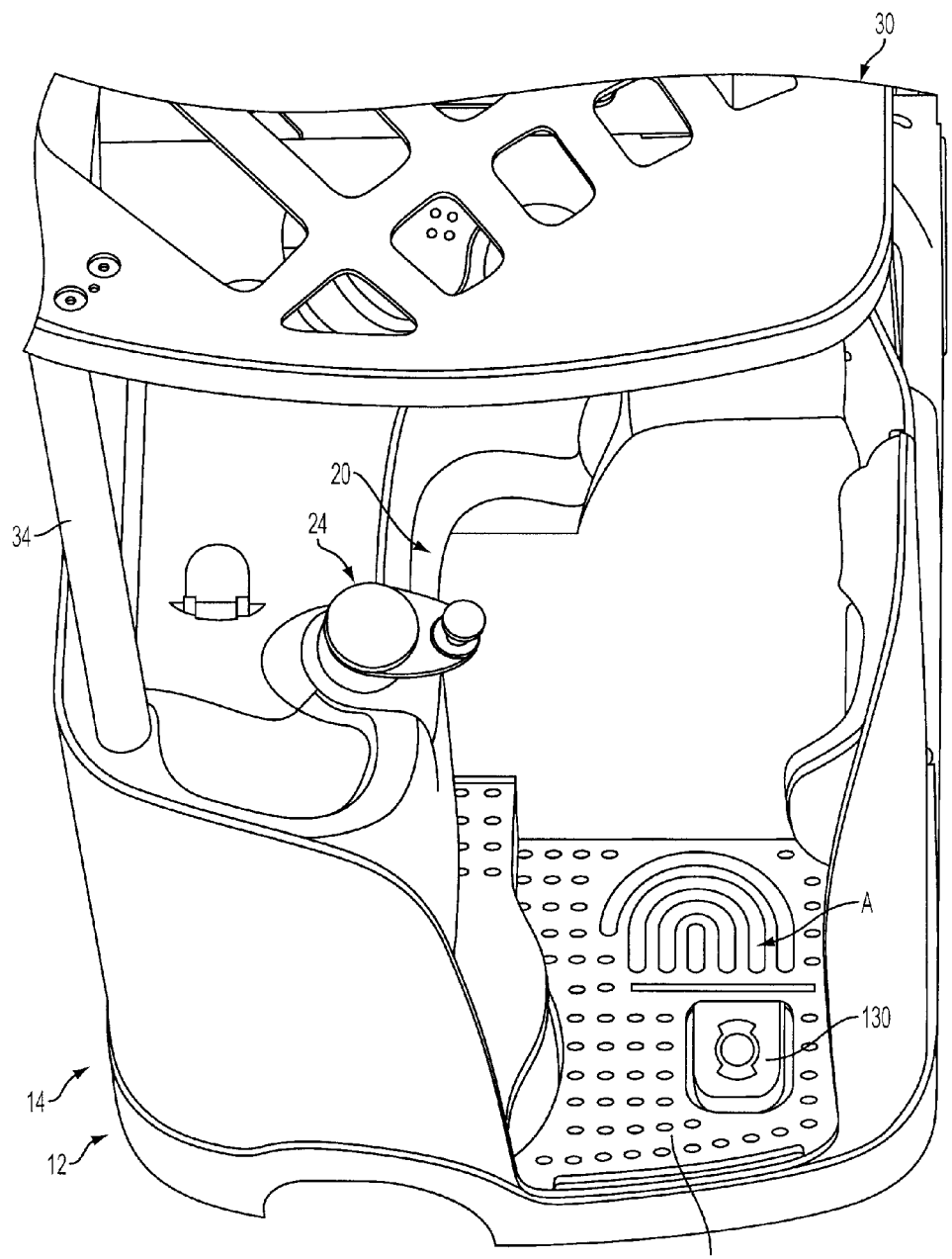
FIG. 4 is a perspective view of a rear portion of the truck illustrated in FIG. 1.

The truck 10 further includes mast structure 40, see FIGS. 1 and 3, comprising first, second and third mast weldments 42, 44 and 46, see also FIG. 2 (the mast structure 40 is not illustrated in FIGS. 5-8). The second weldment 44 is nested within the first weldment 42 and the third weldment 46 is nested within the second weldment 44. The first weldment 42 is coupled to the truck frame main body 14. The second or intermediate weldment 44 is capable of vertical movement relative to the first weldment 42. The third or inner weldment 46 is capable of vertical movement relative to the first and second weldments 42 and 44.

A fork carriage structure 50 is coupled to the mast structure 40. The fork carriage structure 50 comprises a pair of forks 52 and a fork carriage 54 upon which the forks 52 are mounted, see FIG. 2 (the fork carriage structure 50 is not illustrated in FIGS. 5-8). The fork carriage structure 50 is coupled to the third weldment 46 for reciprocating movement relative to the third weldment 46.

The mast structure 40 in combination with the fork carriage structure 50 are referred to herein as mast apparatus 300.

Figure 5:
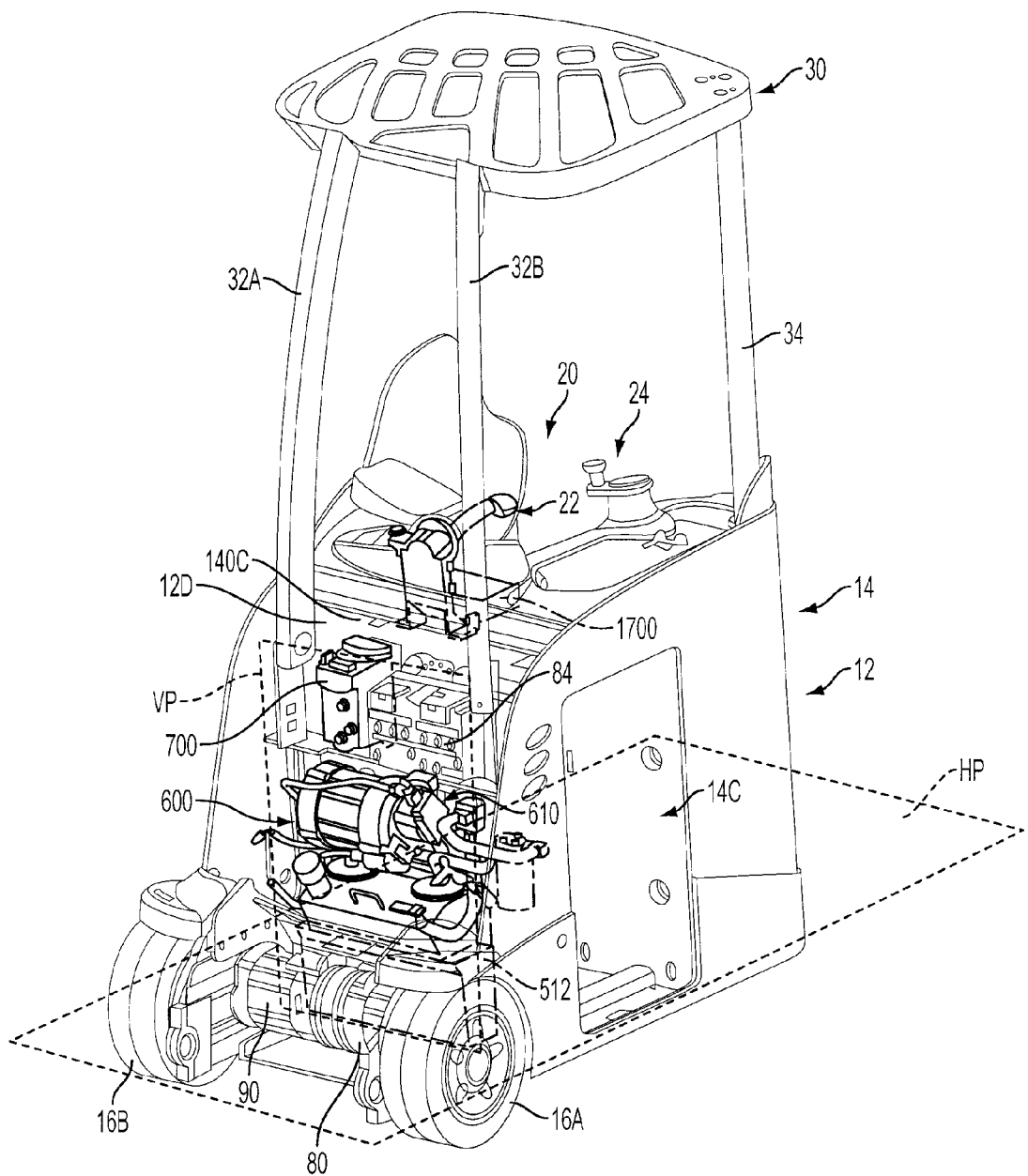
FIGS. 5-8 are perspective views of the truck illustrated in FIG. 1 with mast apparatus and a battery removed.
Figure 10:
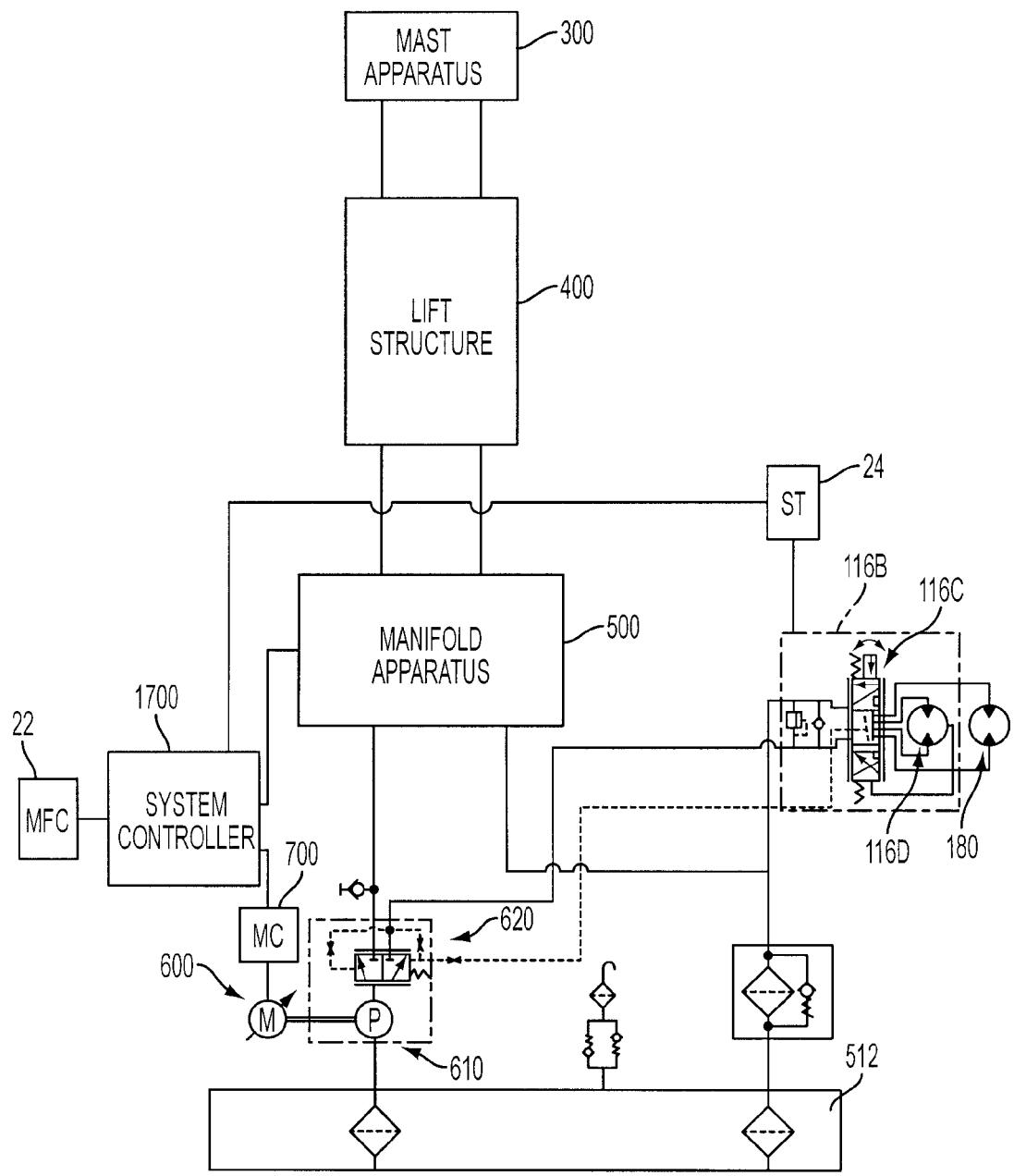
FIG. 10 is a schematic diagram illustrating mast apparatus, lift structure, manifold apparatus, a motor, a hydraulic pump coupled to the motor, a steering control unit, a hydraulic fluid reservoir, a system controller and a controller for the motor coupled to the pump.

An operator controls movement of the second and third weldments 44 and 46 relative to the first weldment 42 and movement of the fork carriage structure 50 relative to the third weldment 46 via the multifunction controller 22, see FIG. 5. The multifunction controller 22 is coupled to a system controller 1700 positioned above the battery compartment 14C, see FIGS. 5 and 10. Lift structure 400 comprising hydraulic cylinder assemblies are coupled to the first, second and third weldments 42, 44, 46 and the fork carriage structure 50 for effecting movement of the second and third weldments 44 and 46 relative to the first weldment 42 and the fork carriage structure 50 relative to the third weldment 46. Hydraulic fluid stored in a hydraulic fluid reservoir 512, see FIGS. 5 and 10, is provided to the lift structure 400 via a positive displacement pump 610 and a manifold apparatus 500, see FIG. 10. The pump 610 is driven by a variable speed motor 600 controlled via a motor controller 700 which, in turn, is controlled via the system controller 1700, see FIGS. 5 and 10. The motor 600 and pump 610 are mounted to the frame front wall 12D, see FIG. 5. The motor 600 and pump 610 are also referred to herein as a motor/pump assembly. Manifold apparatus 500 includes a plurality of mechanical and electronically controlled valves (not shown), wherein the electronically controlled valves are controlled by the system controller 1700. The lift structure 400, manifold apparatus 500, motor 600 and pump 610 are disclosed in commonly assigned, copending U.S. patent application Ser. No. 11/557,545, filed Nov. 8, 2006, by Rekow et al., and entitled "A Materials Handling Vehicle with Improved Visibility," the entire disclosure of which is incorporated by reference herein. In response to lift commands generated by the multifunction controller 22, the system controller 1700 controls, through a conventional contactor panel (not shown) mounted on top of the battery compartment 14C, appropriate electronically controlled valves in the manifold apparatus 500 and, via the motor controller 700, the speed of the motor 600 such that the pump 610 generates a given fluid flow required by the lift structure 400 to lift the carriage structure 50 and the second and third weldments 44 and 46 at a desired rate.

Figure 6:
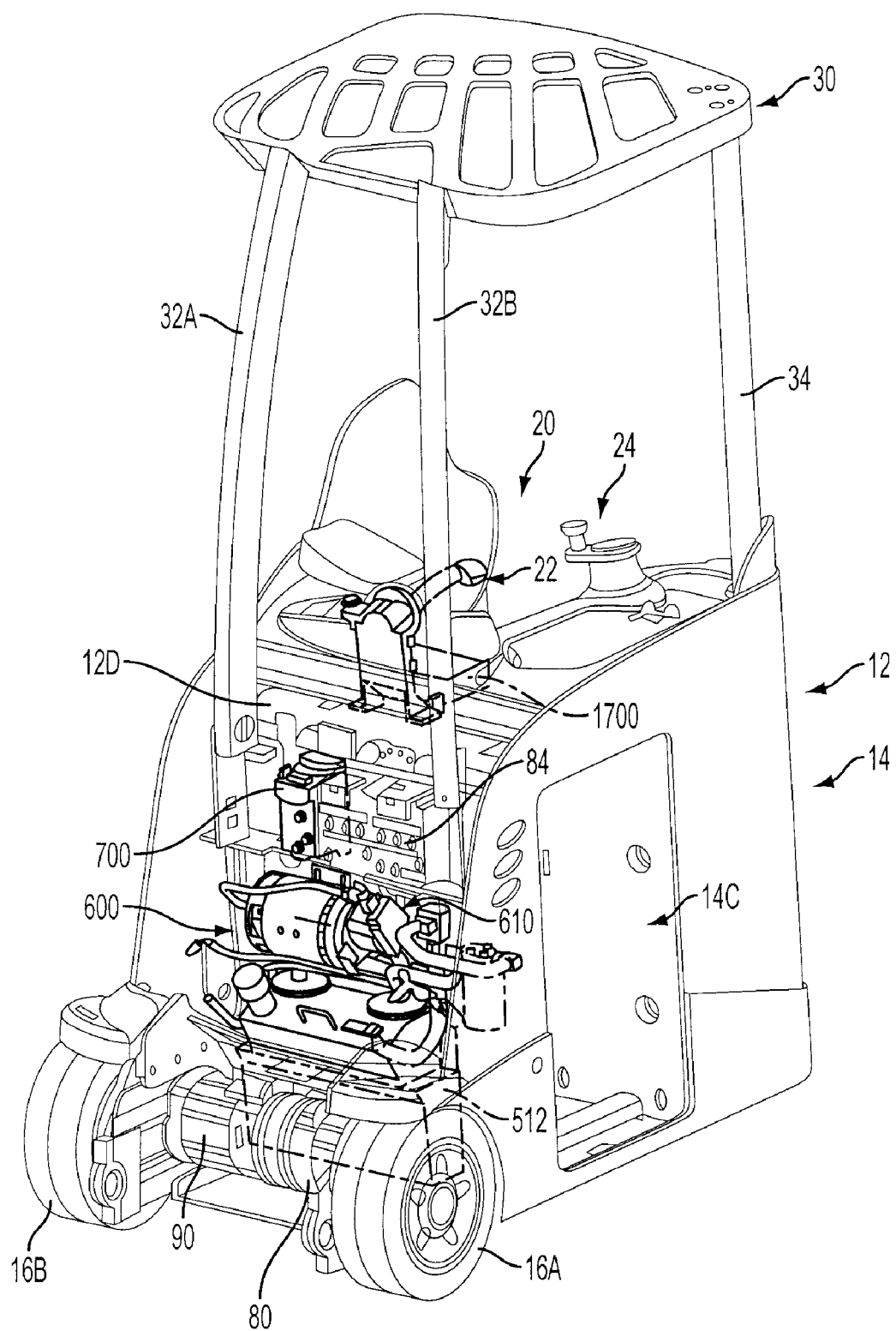
Figure 11:
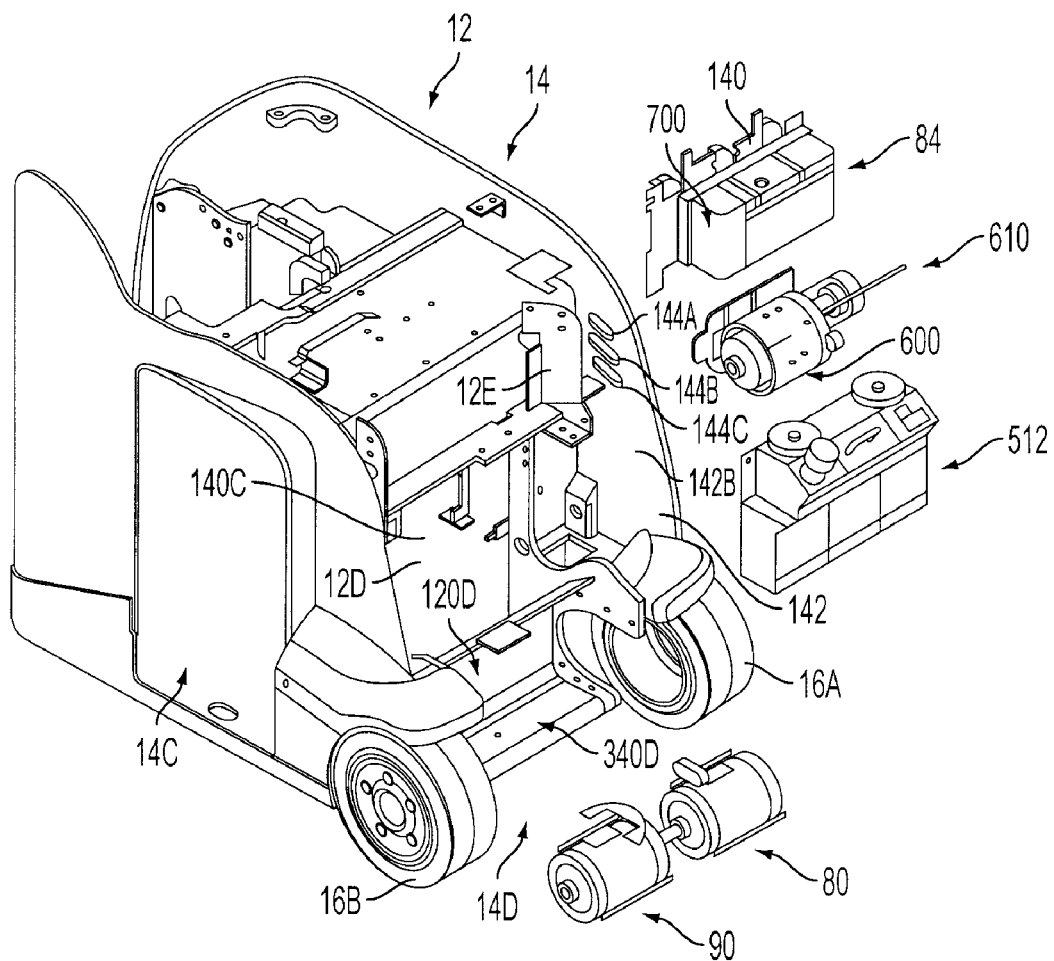
FIG. 11 is an exploded view of a frame main body, first and second AC drive motors, an AC drive motor controller unit, the motor coupled to the hydraulic pump, the motor controller for the motor coupled to the hydraulic pump and the hydraulic fluid reservoir.

The hydraulic fluid reservoir 512 is mounted to a lower portion 120D of the front wall 12D of the frame 12 below the motor 600 and pump 610, see FIGS. 5, 6 and 11. The motor controller 700 is mounted to the front wall 12D of the frame 12 above the motor 600 and pump 610 via a mounting plate 140, see FIGS. 5 and 11.

Figure 8:
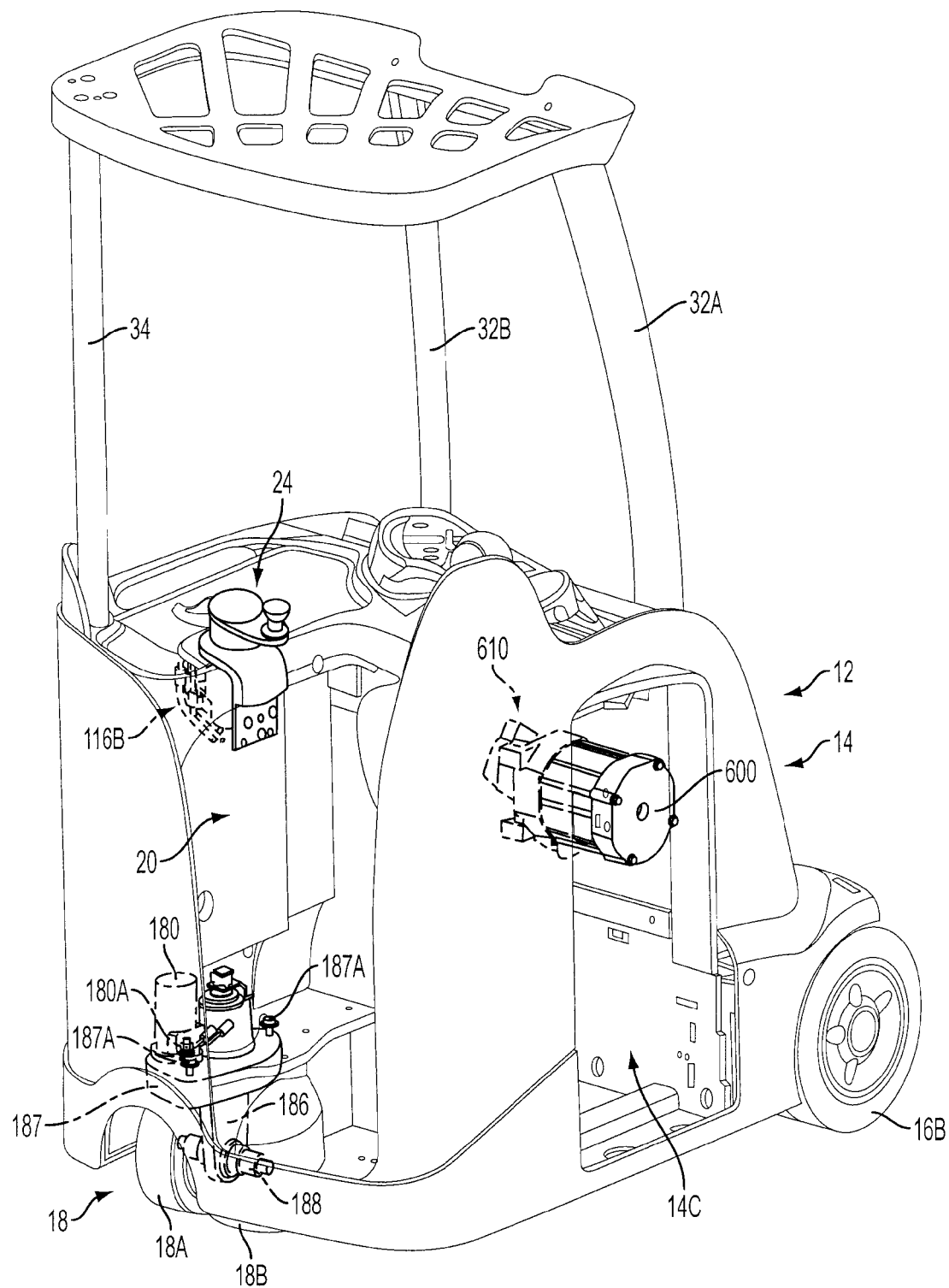
Figure 9:
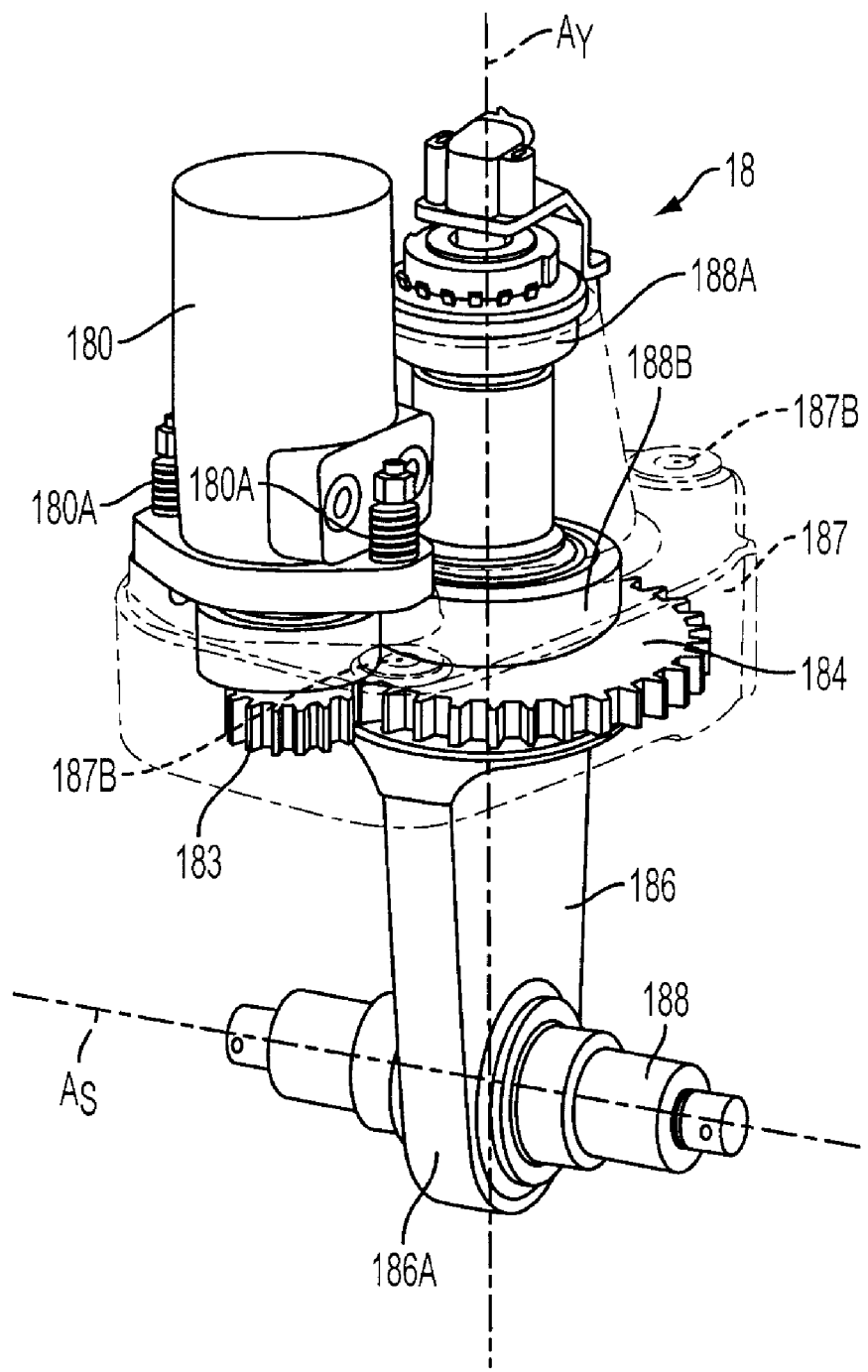
FIG. 9 is a perspective view of a rear steer wheel assembly of the truck illustrated in FIG. 1 with wheels removed.

In the illustrated embodiment, the rear steer wheel assembly 18 comprises a hydraulic motor 180 coupled to a yoke casing 187, shown in solid line in FIG. 8 and phantom in FIG. 9, via bolts 180A, see FIG. 9. The motor 180 comprises an output shaft (not shown) to which a pinion gear 183 is coupled for rotation with the shaft. The pinion 183 engages and rotates a turn gear 184, which is coupled to a yoke 186 such that the yoke 186 rotates with the turn gear 184. The yoke 186 is also referred to herein as a steer axle. The yoke 186 is mounted in the yoke casing 187 via bearings 188A and 188B. The casing 187 is mounted to the frame main body 14 via bolts 187A which pass through openings (not shown) in the frame main body 14 and engage threaded openings 187B in the casing 187, see FIGS. 8 and 9. The yoke 186 rotates relative to the casing 187 and the frame main body 14 about an axis $A_Y$, see FIG. 9. A shaft 188 is fixed in a lower portion 186A of the yoke 186 and defines an axis $A_S$ which is transverse to the axis $A_Y$. First and second rear steer wheels 18A and 18B are coupled via bearings (not shown) to the shaft 188 for rotation relative to the shaft 188, see FIGS. 3 and 8. The wheels 18A and 18B are not illustrated in FIG. 9.

As noted above, steering is effected via the steering tiller 24. Rotation of the tiller 24 controls operation of a steering control unit 116B, which comprises a rotary valve 116C and a hydraulic motor 116D, see FIG. 10. The valve 116C is coupled to the tiller 24 and functions to control direction and magnitude of fluid flow to the motor 116D based on tiller movement. Steering of the rear steer wheels 18A and 18B is effected via the hydraulic motor 180, which receives hydraulic fluid from the motor 116D. The motor 116D functions to control the volume of hydraulic fluid per unit turn of the tiller 24 sent to the hydraulic motor 180. The steering control unit 116B is mounted below and coupled to the tiller 24 on the frame 12. The system controller 1700 and the motor controller 700 control the speed of the motor 600 based on movement of the steering tiller 24 such that the pump 610 generates a given fluid flow required by the steering control unit 116B to allow for proper operation of the steering unit 116B in response to movement of the tiller 24 along with a small amount of excess fluid flow. A further discussion of the steering control unit 116B can be found in U.S. patent application Ser. No. 11/557,545, which has previously been incorporated by reference herein.

A mechanical dynamic load sensing priority flow divider valve 620, which, in the illustrated embodiment, is incorporated into the pump 610, functions as a priority valve such that the steering control unit 116B receives hydraulic fluid flow priority over all other hydraulic functions, see FIG. 10. That is, a given fluid flow required by the steering control unit 116B to allow proper operation of the steering unit 116B is provided by the valve 620 before fluid flow passes through the valve 620 to the manifold apparatus 500. A further discussion of the flow divider valve 620 can be found in U.S. patent application Ser. No. 11/557,545, which has previously been incorporated by reference herein.

Referring again to FIG. 2, the frame 12 includes a longitudinal centerline CL located equidistance or centered between first and second outer lateral sides 12A and 12B of the frame 12, see FIG. 2. As is apparent from FIG. 2, the rear steer wheel assembly 18 is offset from the frame longitudinal centerline CL. In the illustrated embodiment, the steer wheel assembly 18 is offset relative to the longitudinal centerline CL such that the yoke axis $A_Y$ is spaced a distance $D_Y$ of about 160 mm from the centerline CL. The distance $D_Y$ may be varied. In the illustrated embodiment, because the rear steer wheel assembly 18 is offset from the frame longitudinal centerline CL, an area A of the floorboard 21 within the operator compartment 20 is optimized (generally a larger floorboard area is desirable) such that the area A is between about 199,740 mm$^2$ and about 227,600 mm$^2$, see FIG. 2. The rear steer wheels 18A and 18B turn about the axis $A_Y$ through a sweep sphere, a portion of which is defined by sweep sphere panel SSP in FIG. 2. Because the rear steer wheel assembly 18 is offset relative to the frame longitudinal centerline CL, only a small portion SSP of the floorboard 21, i.e., the sweep sphere panel SSP, must be shaped or curved to accommodate the sweep sphere of the rear steer wheels 18A and 18B, see FIG. 2. The floorboard 21 has a low height $H_{FL}$ from ground. In the illustrated embodiment, the floorboard 21 has a floorboard height $H_{FL}$ between about 188 mm and 239 mm and preferably is about 214 mm, see FIG. 3.

The truck 10 has a stability triangle 200 defined by a first point 200A centered on the first front wheel 16A, a second point 200B centered on the second front wheel 16B and a third point 200C located between the first and second rear wheels 18A and 18B generally at the intersection of the shaft and yoke axes $A_S$ and $A_Y$. The first, second and third points 200A-200C are located in generally the same horizontal or X-Y plane, see FIG. 2, and define support points for the frame 12. A Z-axis transverse to the X and Y axes extends out of the plane of FIG. 2. As noted above, the rear steer wheel assembly is offset relative the frame longitudinal centerline CL. Hence, the third point 200C of the stability triangle 200 is offset from the frame longitudinal centerline CL toward the first lateral side 12A of the frame 12. Due to the offset third point 200C, the stability triangle 200 defines a scalene triangle, i.e., a non-isosceles triangle, see FIG. 2.

It is preferred that an X-Y position of a center of gravity $CG_T$ for the truck 10, including any load on the forks 52, be located within the stability triangle 200. With no load on the forks 52, the X-Y position of the center of gravity $CG_T$ of the truck 10 is preferably generally centered within the stability triangle 200. In the present invention, the battery 60 is laterally shifted in the battery compartment 14C of the main body 14 towards the first lateral side 12A of the frame 12, see FIG. 2. Consequently, an X-Y position of a center of gravity $CG_B$ of the battery 60 is offset or spaced from the frame longitudinal centerline CL by a distance $D_B$, which, in the illustrated embodiment, is about 25.4 mm. A counterweight CW for the truck 10 is located between the frame longitudinal centerline CL and the first lateral side 12A of the frame 12 and over the rear steer wheel assembly 18. The counterweight CW has a center of gravity $CG_{CW}$ with an X-Y position offset or spaced from the centerline CL by a distance $D_{CW}$, which, in the illustrated embodiment, is about 338 mm. Due to the X-Y position of the center of gravity $CG_B$ of the battery 60 and the X-Y position of the center of gravity $CG_{CW}$ of the counterweight CW, the X-Y position of the center of gravity $CG_T$ of the truck 10 with no load on the forks 52 is positioned between the frame longitudinal centerline CL and the first lateral side 12A of the frame 12. More specifically, the X-Y position of the center of gravity $CG_T$ of the truck 10 is offset or spaced from the centerline CL by a Distance $D_T$, which, in the illustrated embodiment, is about 62.5 mm. The X-Y position of the center of gravity $CG_T$ of the truck 10 with no load on the forks 52 is also generally centered between the front wall 12D of the frame 12 and a rear wall 220D of the frame 12. As is apparent from FIG. 2, the X-Y position of the center of gravity $CG_T$ of the truck 10 with no load on the forks 52 is generally centered within the stability triangle 200.

It is also noted that a substantial portion of the operator compartment 20 is positioned between the longitudinal center line CL and a second side 12B of the frame 12.

Figure 7:
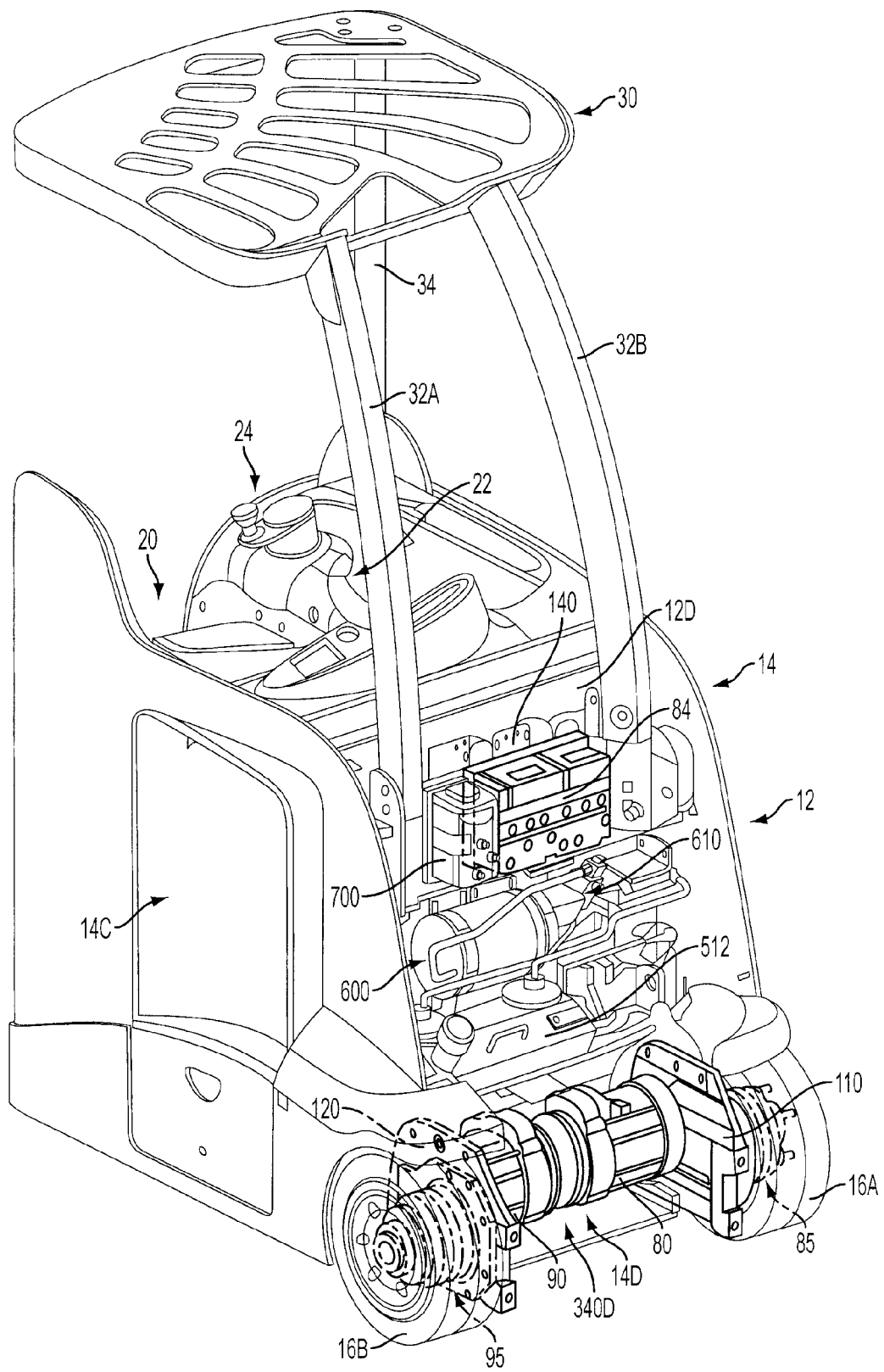

The first wheel 16A is driven by a first AC drive motor 80 and the second wheel 16B is driven by a second AC drive motor 90, see FIG. 7.

The first AC motor 80 has an output shaft with a first helical gear (not shown) coupled to the output shaft. The first helical gear engages a larger second helical gear (not shown). A sun gear (not shown) is coupled to the second helical gear so as to rotate with the second helical gear. A first speed reduction of approximately 4.84 results from the first helical gear to the sun gear. The sun gear comprises part of a first planetary gear box 85, see FIG. 7, having first, second and third planetary gears (not shown) which engage a ring gear (not shown). The ring gear is coupled to the first wheel 16A such that the first wheel 16A rotates with the ring gear. A second speed reduction of about 5.57 occurs from the sun gear to the ring gear.

Figure 7A:
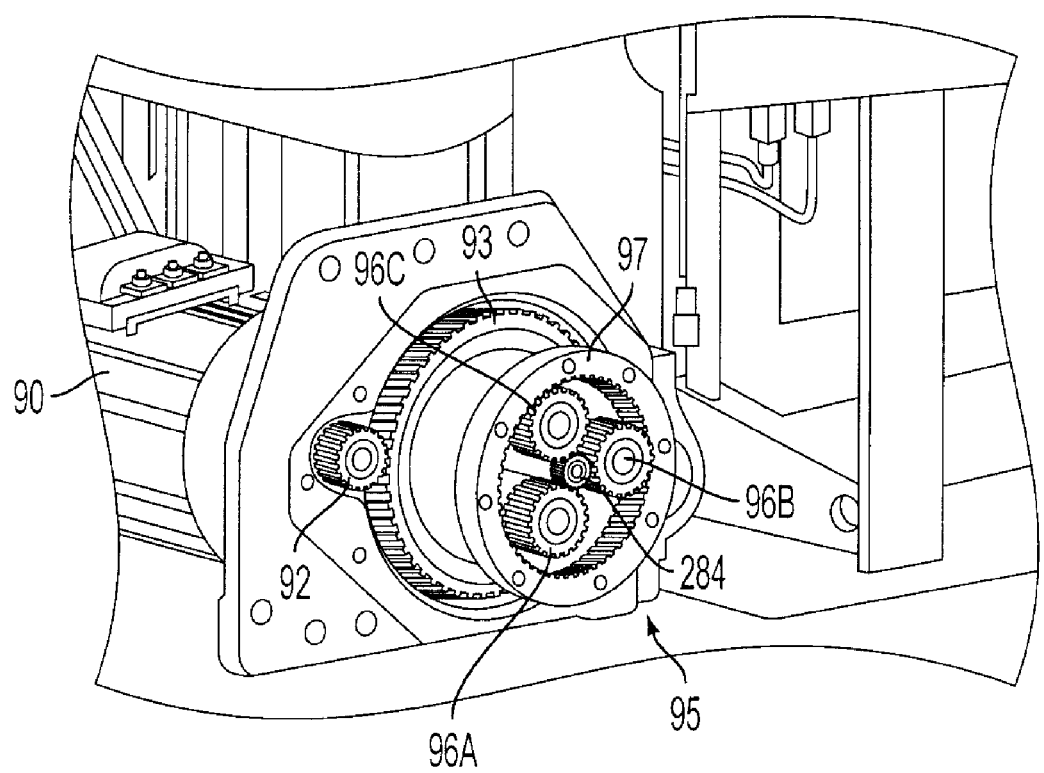
FIG. 7A is a view of a second AC drive motor and a corresponding second planetary gear box.

The second AC motor 90 has an output shaft with a first helical gear 92 coupled to the output shaft for rotation with the output shaft, see FIG. 7A. The first helical gear 92 engages a larger second helical gear 93. A sun gear 284 is coupled to the second helical gear 93 so as to rotate with the second helical gear 93. A first speed reduction of approximately 4.84 results from the first gear 92 to the sun gear 284. The sun gear 284 comprises part of a second planetary gear box 95 having first, second and third planetary gears 96A-96C which engage a ring gear 97. The ring gear 97 is coupled to the second wheel 16B such that the second wheel 16B rotates with the ring gear 97. A second speed reduction of about 5.57 occurs from the sun gear 284 to the ring gear 97.

The first AC motor 80 and the first planetary gear box 85 are coupled to a first mounting plate 110 and the second AC motor 90 and the second planetary gear box 95 are coupled to a second mounting plate 120. The two mounting plates 110 and 120 are not illustrated in FIG. 11. The plates 110 and 120 are coupled to a low part 340D of the front portion 14D of the frame main body 14 such that the motors 80, 90 and the gear boxes 85, 95 are positioned low within the frame 12 near the wheels 16A, 16B and away from the frame front wall 12D, see FIGS. 7 and 11.

Both motors 80, 90 are controlled via a separate AC drive motor controller, wherein both controllers are housed within a single housing so as to define a single drive motor controller unit 84. Hence, drive motor controller unit 84 contains two separate controllers for controlling respectively the first and second AC drive motors 80, 90 in the illustrated embodiment. The drive motor controller unit 84 is mounted via the mounting plate 140 to the front wall 12D of the frame 12 above the motor 600 and the pump 610, see FIGS. 5-7 and 11. While each motor 80, 90 is provided with a separate controller in the illustrated embodiment, it is contemplated that a single controller could be provided for controlling both AC drive motors 80, 90.

In response to speed signals generated by the multifunction controller 22, the controller unit 84 controls the operation of the first and second AC motors 80, 90 so as to effect rotation of the wheels 16A, 16B at a desired speed. In response to direction of movement signals generated by the multifunction controller 22, the system controller 1700 in conjunction with the controller unit 84 cause the drive motors 80, 90 to rotate in the appropriate forward or reverse direction. Braking of the wheels 16A, 16B, at least part of the time, is also effected via the motors 80, 90 in response to braking commands generated by the multifunction controller 22 and/or a foot brake pedal 130 extending through the floorboard 21 in the operator compartment 20, see FIGS. 2 and 4.

As noted above, the first and second AC motors 80, 90 and the first and second planetary gear boxes 85, 95 are positioned low within the frame 12 near the wheels 16A, 16B and away from the frame front wall 12D. Because the AC motors 80, 90 and the gear boxes 85, 95 are mounted in this manner within the frame 12, sufficient room is provided to mount the reservoir 512 to the lower portion 120D of the frame front wall 12D such that it is positioned between the lower portion 120D of the frame front wall 12D and the motors 80 and 90.

Because the reservoir 512 is mounted to the lower portion 120D of the frame front wall 12D, sufficient area is available on the frame front wall 12D for mounting the controller unit 84 and controller 700. In the illustrated embodiment, a horizontal plane HP passes through each of the first and second AC motors 80, 90, the reservoir 512, the first and second front wheels 16A, 16B and the rear steer wheel assembly 18, see FIG. 5. The hydraulic fluid reservoir 512 is also located in a common vertical plane VP with the motor 600, the pump 610, the controller unit 84 and the controller 700, see FIG. 5.

The AC drive motor controller unit 84 and the controller 700 generate heat. Because the controller unit 84 and controller 700 are coupled to the front wall 12D of the frame 12 via the mounting plate 140, they are spaced away from the operator compartment 20, which is believed to reduce the amount of heat transferred to the operator compartment 20. In a conventional truck, one or more controllers are located over a battery compartment and a contactor panel is located near the operator compartment. In the truck 10 of the present invention, because the controller unit 84 and controller 700 are coupled to the frame front wall 12D, the contactor panel (not shown) is positioned over the battery compartment 14C, thereby allowing the operator compartment 20 to be enlarged. Further because the controller 700 and controller unit 84 are coupled to the frame front wall 12D, the overall height of structure above the battery compartment 14C is reduced so as to enhance operator visibility.

Figure 12:
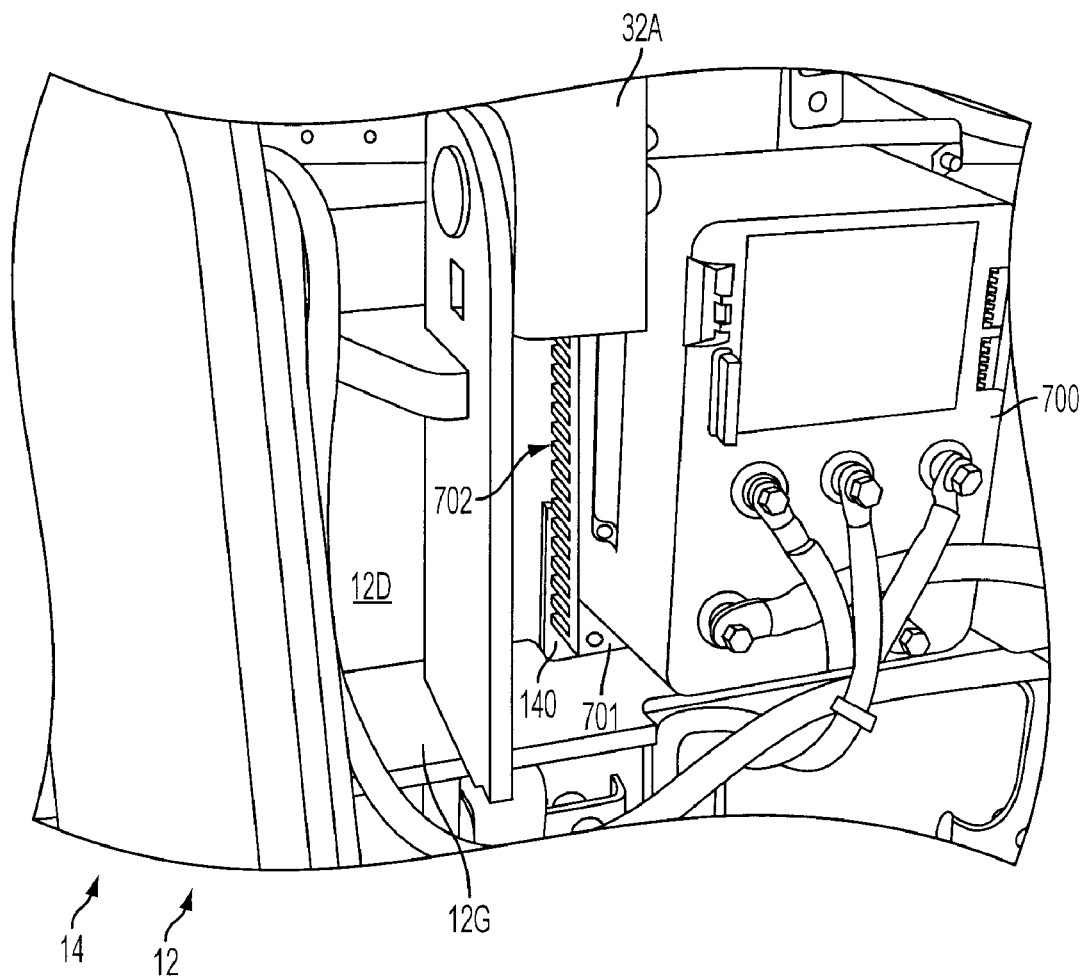
FIG. 12 is a view of a portion of the front wall of the frame and the motor controller for the motor coupled to the hydraulic pump.
Figure 15:
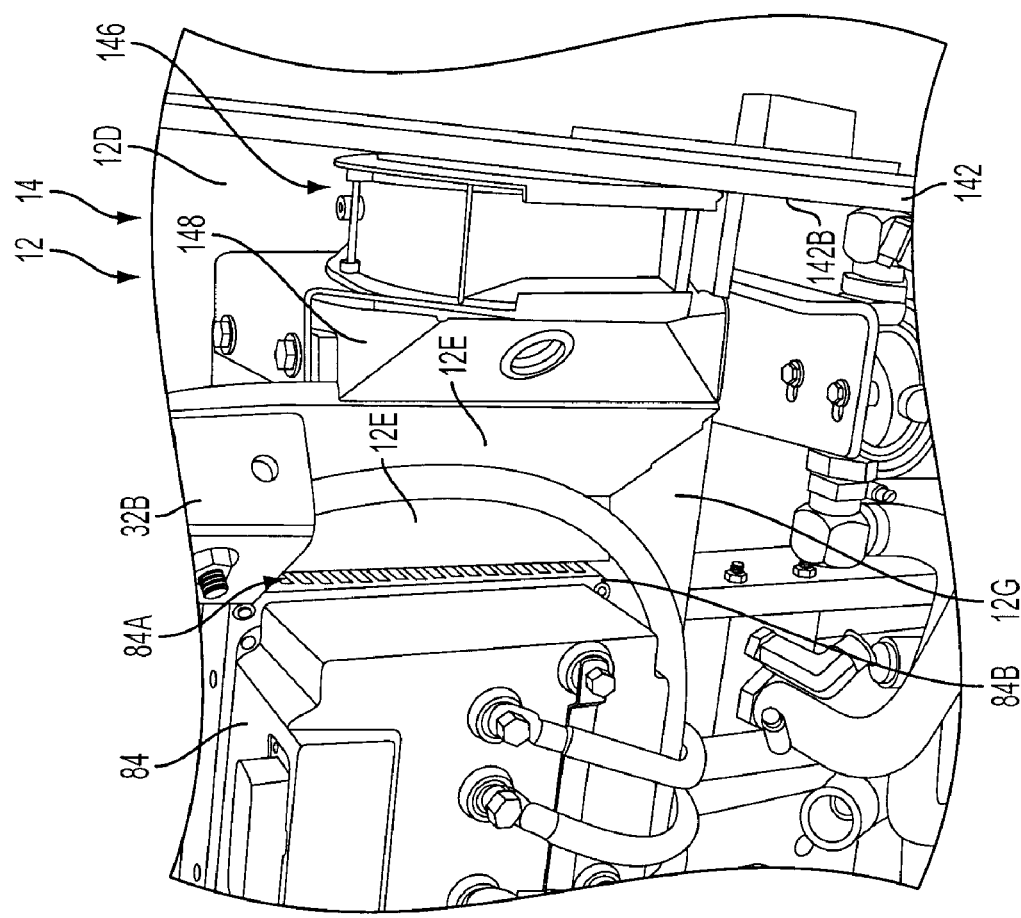
FIGS. 15 and 16 are views showing a fan and second diverter plate positioned adjacent to the frame front wall and the frame side wall.

As noted above, the AC drive motor controller unit 84 and the motor controller 700 are coupled to the front wall 12D of the frame 12 via the mounting plate 140. The controller 700 includes a rear wall 701 from which cooling fins 702 extend, see FIG. 12. The cooling fins 702 face the mounting plate 140 when the controller 700 is coupled to the mounting plate 140. The AC drive motor controller unit 84 includes a rear wall 84B from which cooling fins 84A extend, see FIG. 15. The cooling fins 84A face the mounting plate 140 when the controller unit 84 is coupled to the mounting plate 140. The cooling fins 84A, 702 face toward the front wall 12D of the frame 12 when the mounting plate 140 is coupled to the front wall 12D, see FIGS. 12 and 15.

Figure 13:
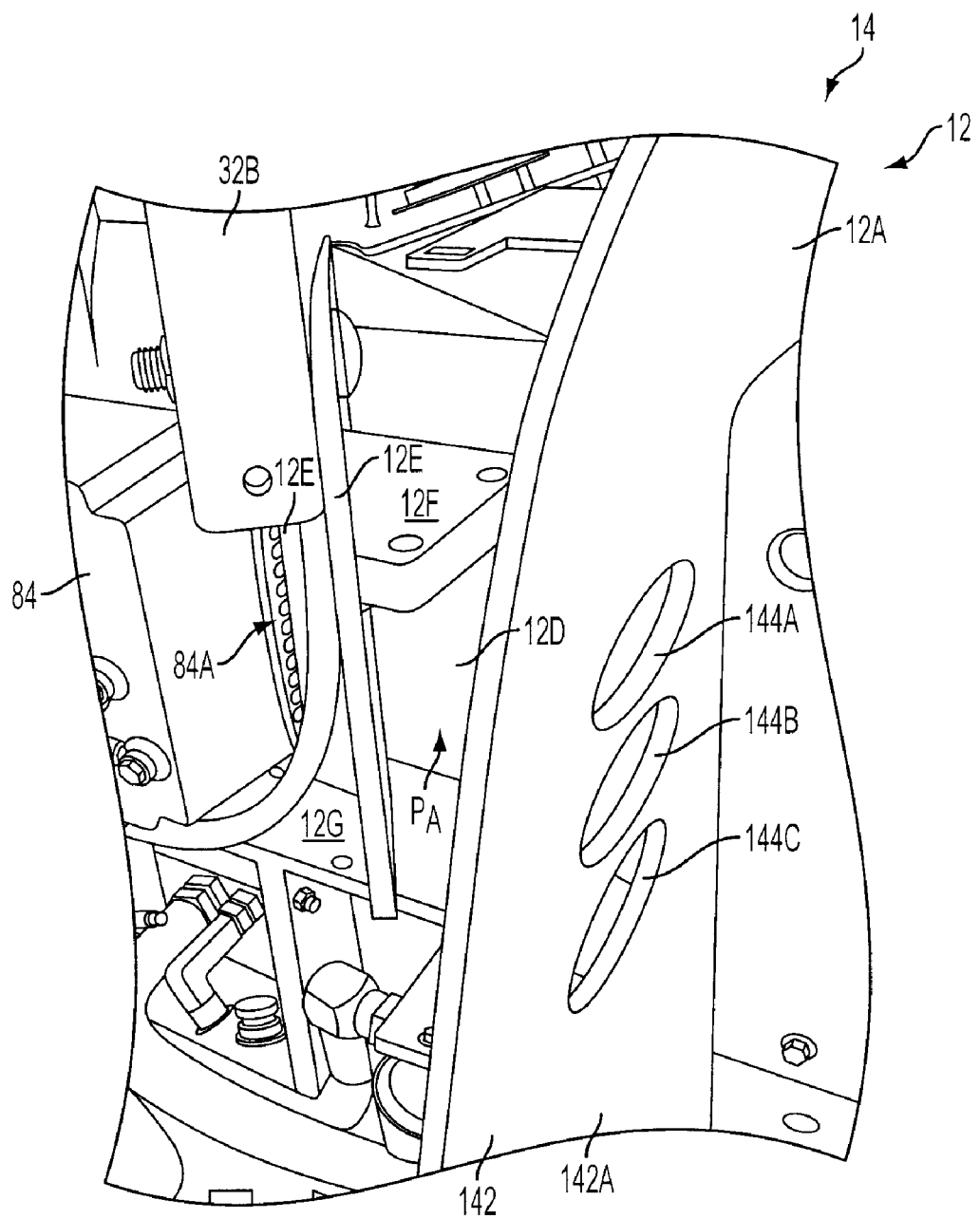
FIGS. 13 and 14 are perspective views of vents provided in a frame side wall, a bracket, an intermediate wall and a first diverter plate, wherein a fan and a second diverter plate are not illustrated.
Figure 14:
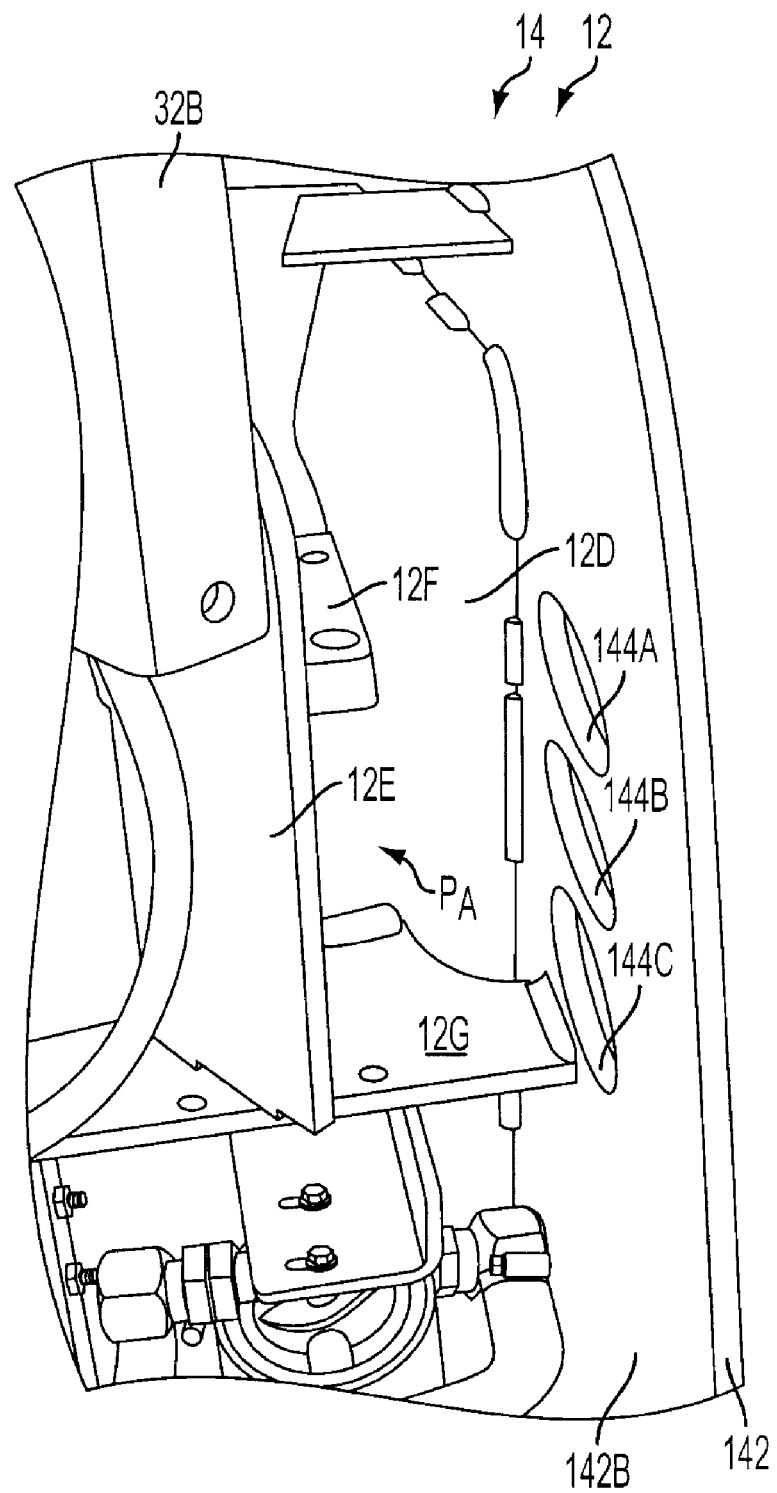
Figure 16:
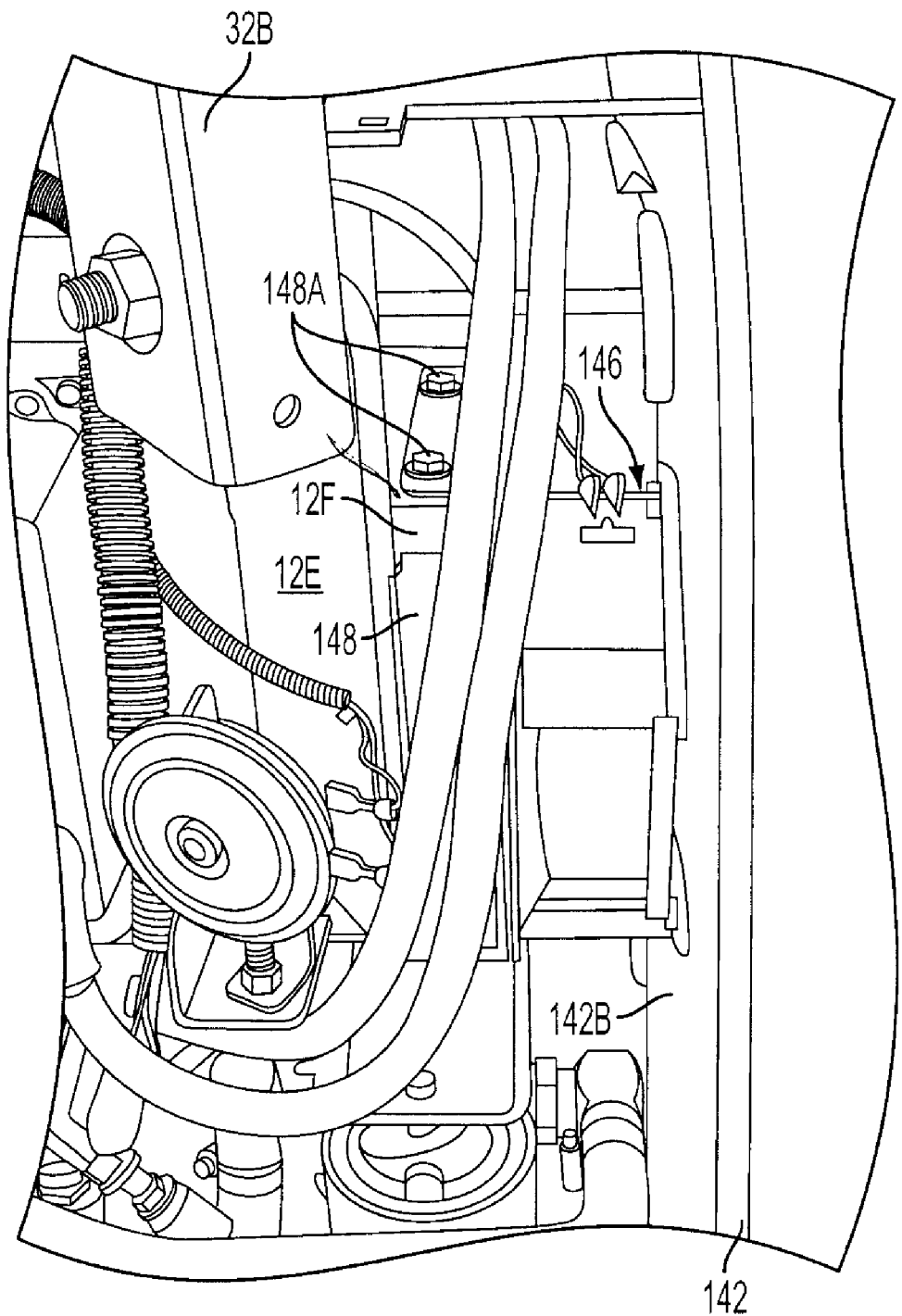

The frame 12 comprises a first side wall 142 defining the first outer lateral side 12A of the frame 12, see FIGS. 2 and 13. The first side wall 142 has an outer surface 142A and an inner surface 142B. First, second and third vent openings 144A-144C are provided in and extend completely through the side wall 142 to allow cooling air to pass through the side wall 142, see FIGS. 13 and 14. A fan 146 is positioned next to the inner surface 142B of the side wall 142, see FIGS. 15 and 16. A first diverter plate 12E, a bracket 12F and an intermediate wall 12G are welded so as to be integral with the front wall 12D of the frame 12 and define with the front wall 12D a portion of a passage $P_A$ extending to the fins 84A of the AC drive motor controller unit 84, see FIGS. 13 and 14. A second diverter plate 148 is provided between the fan 146 and the first diverter plate 12E and the bracket 12F and defines part of the passage $P_A$. The fan 146 and second diverter plate 148 are coupled to the bracket 12F via bolts 148A, see FIG. 16. The fan 146 functions to pull air through the first, second and third vent openings 144A-144C and move the air through the passage $P_A$ defined by the first and second diverter plates 12E and 148, the bracket 12F, the intermediate wall 12G and the front wall 12D of the frame 12. After passing through the passage $P_A$, the air moves along a path defined by the mounting plate 140, the frame front wall 12D, the rear walls 84B and 701 of the controller unit 84 and controller 700 and the fins 84A and 702 of the controller unit 84 and controller 700 such that the air passes between and along the cooling fins 84A and 702. The air passing across the cooling fins 84A and 700 functions to convectively cool the controller unit 84 and controller 700, i.e., energy in the form of heat is transferred from the fins 84A and 702 to the air passing over the fins 84A and 702.

It is noted that the A-pillars 32A, 32B are spaced a sufficient distance from the frame front wall 12D so as to allow the first diverter plate 12E, the bracket 12F, and the intermediate wall 12G to be coupled with and extend from the front wall 12D and also to allow the second diverter plate 148 and the fan 146 to be coupled to the bracket 12F. Because the A-pillars 32A, 32B are spaced away from the frame front wall 12D, they do not extend into the passage $P_A$ defined by the first and second diverter plates 12E and 148, the bracket 12F, the intermediate wall 12G and the front wall 12D of the frame 12 or the path defined by the mounting plate 140, the frame front wall 12D, the rear walls 84B and 701 of the controller unit 84 and controller 700 and the fins 84A and 702 of the controller unit 84 and controller 700. It is also noted that the A-pillar 32B is spaced inwardly and away from the inner surface 142B of the first side wall 142 so as to allow sufficient room for the fan 146 to be mounted between the first side wall 142 and the A-pillar 32B, see FIGS. 15 and 16.

Figure 17:
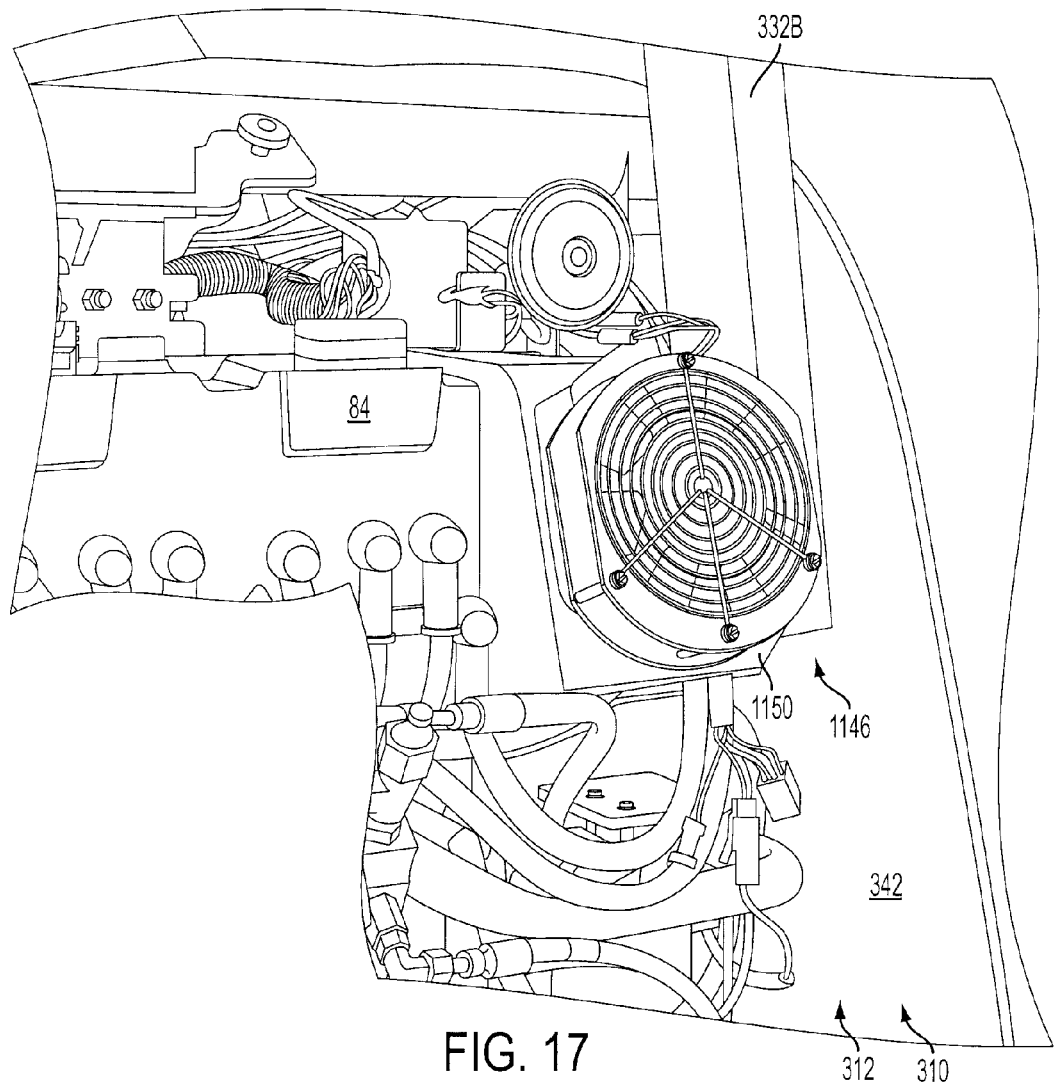
FIG. 17 is a perspective view of a counterbalanced truck constructed in accordance with a second embodiment of the present invention.
Figure 18:
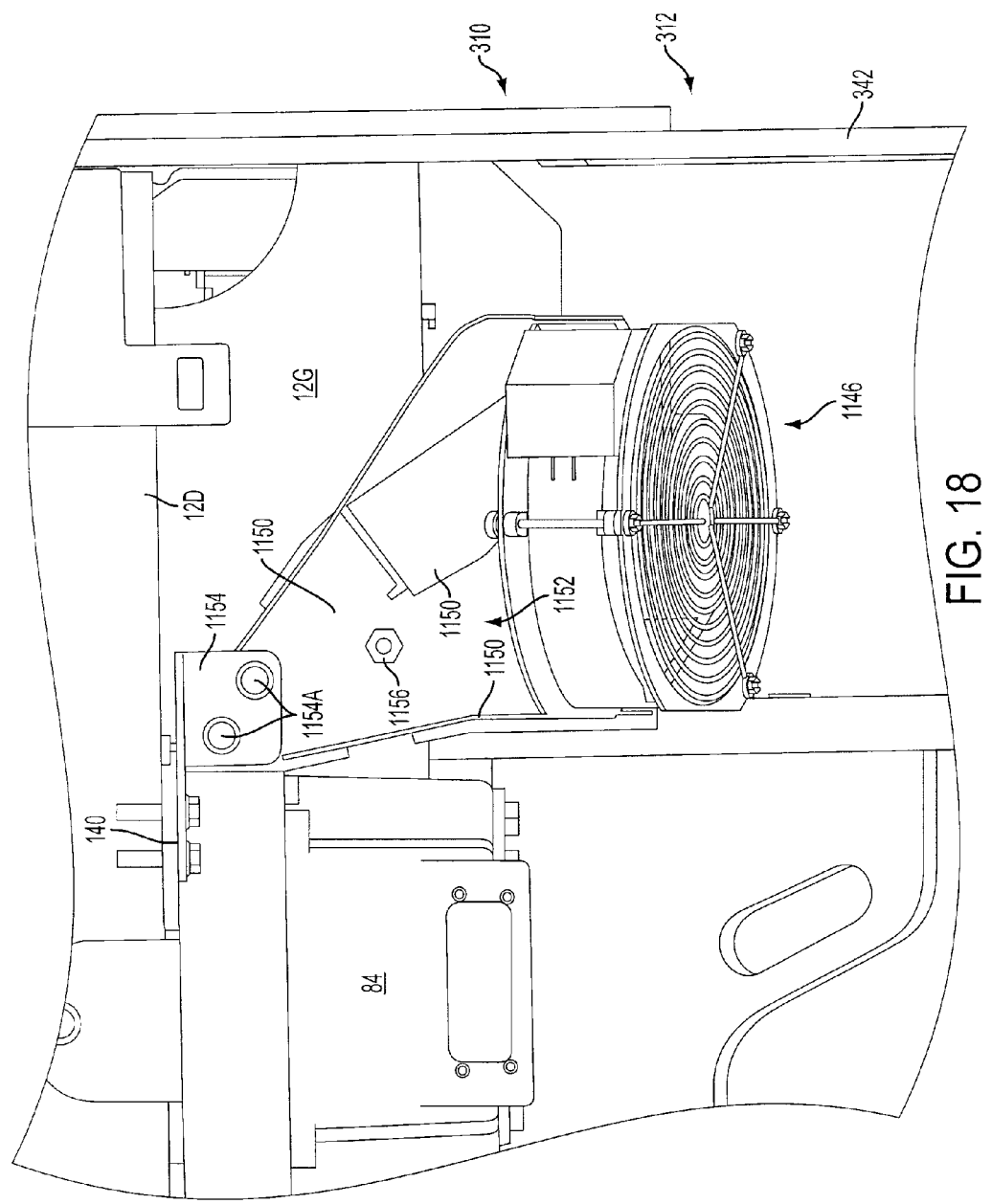
FIGS. 18-20 are perspective views of a fan and diverter bracket of the truck illustrated in FIG. 17, wherein a top plate of the diverter bracket is not illustrated in FIGS. 18 and 19.
Figure 19:
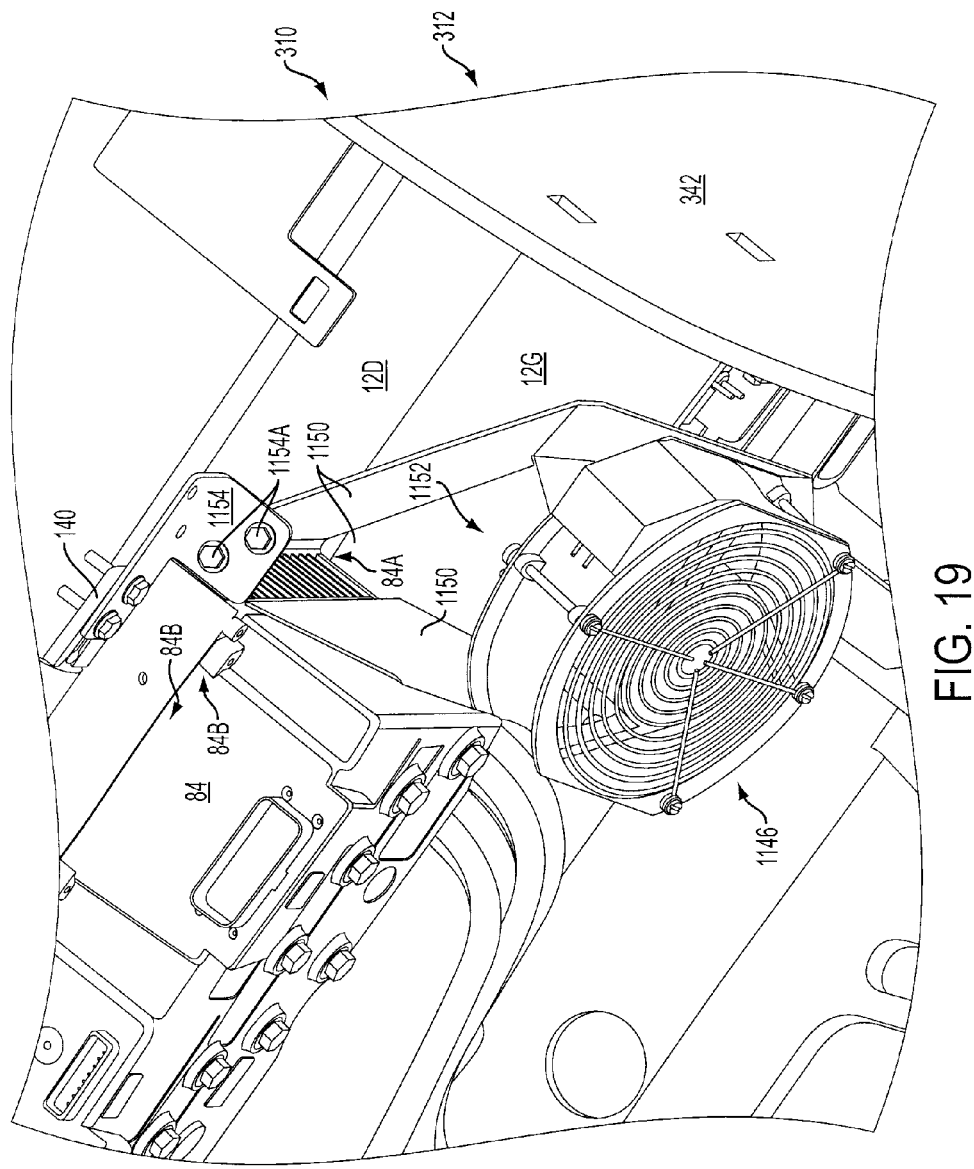
Figure 20:
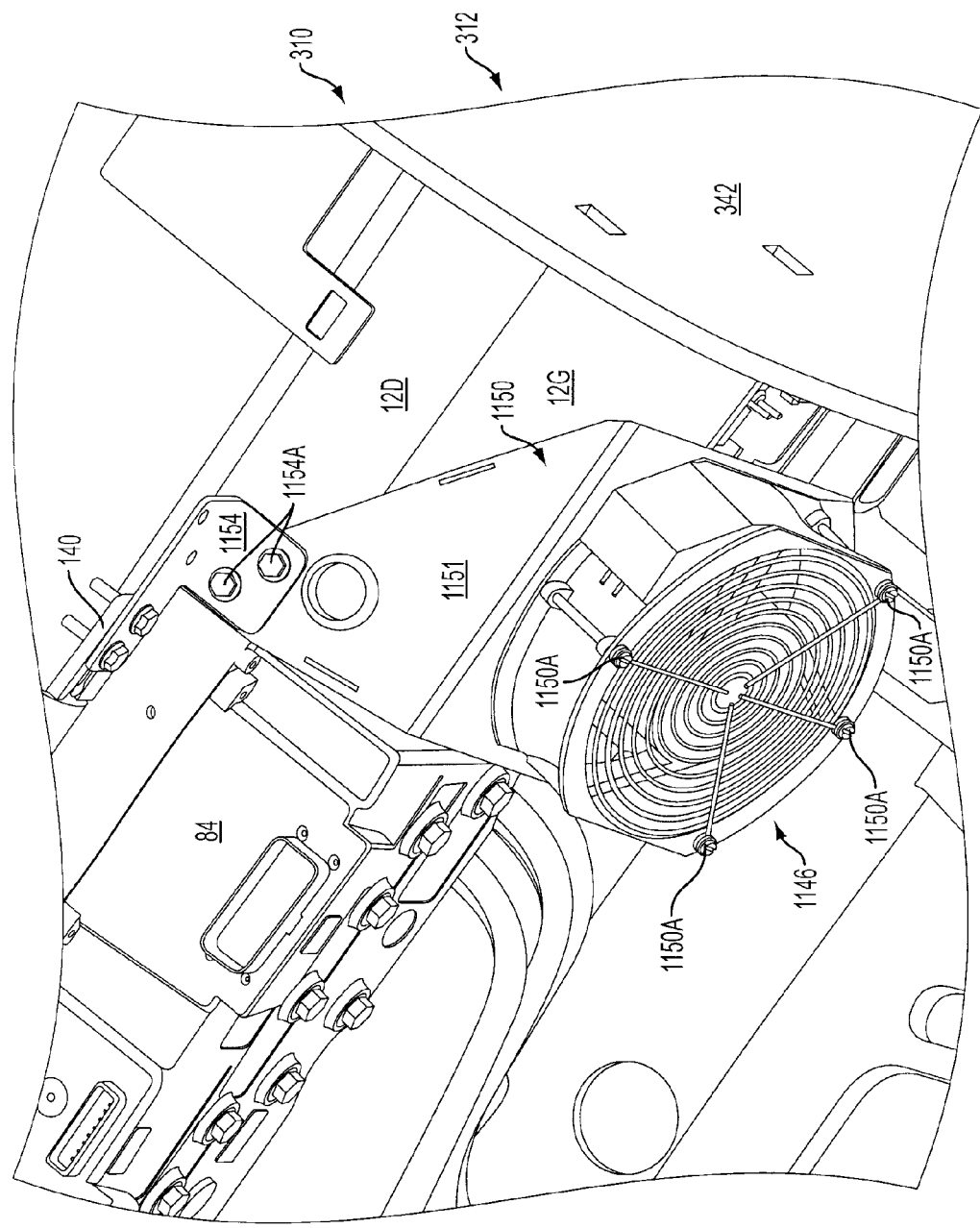

A counterbalanced fork lift truck 310 constructed in accordance with a second embodiment of the present invention is shown in FIGS. 17-20, where like elements are referenced by like reference numerals. The truck 310 comprises a fan 1146 positioned between the controller unit 84 and a second A-pillar 332B, see FIG. 17. The second A-pillar 332B is illustrated in FIG. 17 but is not shown in FIGS. 18-20. In the embodiment illustrated in FIGS. 17-20, the A-pillar 332B is coupled to a side wall 342 of a frame 312 of the counterbalanced fork lift truck 310. The fan 1146 is mounted to a diverter bracket 1150 via bolts 1150A, see FIG. 20. A top wall 1151 of the diverter bracket 1150 is not shown in FIGS. 18 and 19. The bracket 1150 defines an internal cavity 1152 through which air moves after it passes through the fan 1146. The air then moves from the internal cavity 1152 into and through a path defined by the mounting plate 140, the frame front wall 12D, the rear walls 84B and 701 of the controller unit 84 and controller 700 and the fins 84A and 702 of the controller unit 84 and controller 700. The diverter bracket 1150 is coupled to the mounting plate 140 via a mounting bracket 1154 and bolts 1154A and to the intermediate wall 12G of the frame 312 via a bolt 1156. The mounting plate 140 is coupled to the frame front wall 12D. Cooling air is moved by the fan 1146 into and through the diverter bracket 1150 and then through the path defined by the mounting plate 140, the frame front wall 12D, the rear walls 84B and 701 of the controller unit 84 and controller 700 and the fins 84A and 702 of the controller unit 84 and controller 700 so as to cool the fins 84A and 702.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:
   a frame including structure for defining an operator compartment and structure for defining a battery compartment and including a front wall spaced away from said operator compartment in a forward direction;
   first and second front wheels coupled to said frame;
   a rear steer wheel assembly coupled to said frame;
   at least one electric motor; and
   at least one controller positioned adjacent to said front wall of said frame and positioned forward of said battery compartment to control the operation of said at least one electric motor.

2. A materials handling vehicle as set out in claim 1, wherein said at least one electric motor comprises a first drive motor coupled to said first wheel for driving said first wheel, and said at least one controller comprising a first controller coupled to said front wall of said frame to control the operation of said first drive motor.

3. A materials handling vehicle as set out in claim 2, wherein said at least one electric motor further comprises a second drive motor coupled to said second front wheel, and said at least one controller further comprises a second controller coupled to said front wall for controlling the operation of said second drive motor.

4. A materials handling vehicle as set out in claim 3, further comprising:
   a motor/pump assembly coupled to said frame;
   a hydraulic reservoir coupled to said frame and in fluid communication with said motor/pump assembly;
   mast apparatus coupled to said frame and including a pair of forks; and
   a third controller coupled to said front wall to control the operation of said motor/pump assembly.

5. A materials handling vehicle as set out in claim 2, wherein said first controller comprises cooling fins and further comprising a fan mounted to said frame near said frame front wall to force air along a path in front of said frame front wall so as to pass over said cooling fins.

6. A materials handling vehicle as set out in claim 5, wherein said front wall of said frame is defined by a front wall of said battery compartment and said frame further comprising a side wall extending forward of said battery compartment front wall, said fan being mounted adjacent to said side wall.

7. A materials handling vehicle as set out in claim 6, wherein said side wall includes at least one opening, said fan pulling air through said at least one opening in said side wall and moving said air along said path in front of said battery compartment front wall.

8. A materials handling vehicle as set out in claim 1, wherein said at least one controller comprises cooling fins and further comprising a fan mounted to said frame near said frame front wall to force air along a path in front of said frame front wall so as to pass over said cooling fins.

9. A materials handling vehicle as set out in claim 8, wherein said front wall of said frame is defined by a front wall of said battery compartment and said frame further comprises a side wall extending forward of said battery compartment front wall, said fan being mounted adjacent to said side wall.

10. A materials handling vehicle as set out in claim 9, wherein said side wall includes at least one opening, said fan pulling air through said at least one opening in said side wall and directing said air along said path in front of said battery compartment front wall.

11. A materials handling vehicle as set out in claim 8, wherein said at least one controller further comprises a rear wall, said cooling fins extend from said rear wall and are located adjacent to said frame front wall.

12. The materials handling vehicle as set out in claim 1, wherein said at least one controller is directly connected to said front wall via a mounting plate.

13. A materials handling vehicle comprising:
   a frame including structure for defining an operator compartment and structure for defining a battery compartment;
   first and second front wheels coupled to said frame;

a rear steer wheel assembly coupled to said frame;

at least one electric motor coupled to said frame;

a motor/pump assembly coupled to said frame;

a hydraulic fluid reservoir coupled to said frame;

mast apparatus coupled to said frame and including a pair of forks;

at least one controller coupled to a front wall of said frame spaced away from said operator compartment to control the operation of at least one of said at least one electric motor and said motor/pump assembly, said at least one controller including cooling fins; and a fan mounted to said frame near said frame front wall to force air along a path in front of said frame front wall so as to pass over said cooling fins.

14. A materials handling vehicle as set out in claim 13, wherein said front wall of said frame is defined by a front wall of said battery compartment and said frame further comprises a side wall extending forward of said battery compartment front wall, said fan being mounted adjacent to said frame side wall.

15. A materials handling vehicle as set out in claim 14, wherein said frame side wall includes at least one opening, said fan pulling air through said at least one opening in said frame side wall and directing said air along said path in front of said battery compartment front wall.

16. A materials handling vehicle as set out in claim 15, wherein said at least one controller further comprises a rear wall, said cooling fins extending from said rear wall and located adjacent to said frame front wall.

17. The materials handling vehicle as set out in claim 13, wherein said at least one controller is directly connected to said front wall.

18. A materials handling vehicle comprising:

a frame including structure for defining an operator compartment and structure for defining a battery compartment and including a front wall spaced away from said operator compartment in a forward direction;

first and second front wheels coupled to said frame;

at least one drive motor coupled to said frame and at least one of said first and second wheels for driving said one wheel;

a rear steer wheel assembly coupled to said frame;

a motor/pump assembly coupled to said frame;

a hydraulic fluid reservoir coupled to said frame;

mast apparatus coupled to said frame and including a pair of forks; and at least one controller positioned adjacent to said front wall of said frame and positioned forward of said battery compartment to control the operation of at least one of said at least one drive motor and said motor/pump assembly.

19. The materials handling vehicle as set out in claim 18, wherein said at least one controller comprises a controller for controlling said at least one drive motor.

20. The materials handling vehicle as set out in claim 18, wherein said at least one controller comprises a controller for controlling said motor/pump assembly.

21. The materials handling vehicle as set out in claim 20, wherein said at least one controller further comprising a controller for controlling said at least one drive motor.

22. A materials handling vehicle comprising:

a frame including structure for defining an operator compartment and structure for defining a battery compartment;

first and second front wheels coupled to said frame;

a rear steer wheel assembly coupled to said frame;

at least one electric motor; and at least one electronic controller coupled to a front wall of said frame and located forward of said battery compartment and said operator compartment to control the operation of said at least one electric motor.

23. A materials handling vehicle as set forth in claim 22, wherein said at least one controller is not mounted over said battery compartment.

24. A materials handling vehicle as set forth in claim 22, wherein said at least one controller is provided with at least one cooling fin.

* * * * *